US012586505B2

(12) United States Patent
Zuo et al.

(10) Patent No.: US 12,586,505 B2
(45) Date of Patent: Mar. 24, 2026

(54) GRAYSCALE COMPENSATION METHOD, APPARATUS AND SYSTEM, DISPLAY DRIVING METHOD, APPARATUS AND SYSTEM, AND CHIP AND MEDIUM

(71) Applicants: CHENGDU BOE OPTOELECTRONICS TECHNOLOGY CO., LTD., Chengdu (CN); BOE Technology Group Co., Ltd., Beijing (CN)

(72) Inventors: Yini Zuo, Beijing (CN); Shiming Li, Beijing (CN); Eunho Lee, Beijing (CN); Jianan Qin, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/994,839

(22) PCT Filed: May 20, 2024

(86) PCT No.: PCT/CN2024/094282
§ 371 (c)(1),
(2) Date: Jan. 15, 2025

(87) PCT Pub. No.: WO2025/001629
PCT Pub. Date: Jan. 2, 2025

(65) Prior Publication Data

US 2026/0018099 A1 Jan. 15, 2026

(30) Foreign Application Priority Data

Jun. 25, 2023 (CN) ........................ 202310754197.7

(51) Int. Cl.
*G09G 3/20* (2006.01)
*G09G 3/3208* (2016.01)

(52) U.S. Cl.
CPC ......... *G09G 3/2074* (2013.01); *G09G 3/3208* (2013.01); *G09G 2320/0233* (2013.01); *G09G 2320/0626* (2013.01)

(58) Field of Classification Search
CPC ............... G09G 3/2074; G09G 3/3208; G09G 2320/0233; G09G 2320/0626
See application file for complete search history.

(56) References Cited

U.S. PATENT DOCUMENTS 12,033,597 B2 * 7/2024 Guo ......................... G09G 3/36
12,056,901 B2 * 8/2024 Park ...................... G06T 7/0002
(Continued)

FOREIGN PATENT DOCUMENTS

CN 115620655 A 1/2023
CN 116229894 A 6/2023

*Primary Examiner* — Michael J Jansen, II
(74) *Attorney, Agent, or Firm* — WHDA, LLP

(57) ABSTRACT

A grayscale compensating method, a displaying driving method, an apparatus, a system, a chip and a medium. The grayscale compensating method includes: determining compensation coefficients corresponding to a plurality of sub-pixels in a display panel, wherein the compensation coefficients are for characterizing the compensation modes and the compensation magnitudes of brightness compensations to the sub-pixels, wherein the compensation modes include the mode of increasing the brightness and the mode of reducing the brightness; based on the compensation coefficients and to-be-displayed grayscale values corresponding to the sub-pixels, determining correction coefficients corresponding to the plurality of sub-pixels, wherein unequal to-be-displayed grayscale values correspond to unequal correction coefficients, and the correction coefficients are for correcting the compensation magnitudes; and based on the (Continued)

compensation coefficients and the correction coefficients, compensating for the to-be-displayed grayscale values of the plurality of sub-pixels, to reduce the difference in the emitted-light brightnesses of the plurality of sub-pixels.

19 Claims, 7 Drawing Sheets

(56) References Cited

U.S. PATENT DOCUMENTS

2021/0407368 A1* 12/2021 Gao .................... G09G 3/3685
2022/0122295 A1* 4/2022 Park ........................ G06T 11/60
2023/0096842 A1* 3/2023 Guo .................... G09G 3/3607
345/690

* cited by examiner

GRAYSCALE COMPENSATION METHOD, APPARATUS AND SYSTEM, DISPLAY DRIVING METHOD, APPARATUS AND SYSTEM, AND CHIP AND MEDIUM

The present application claims the priority of the Chinese patent application filed on Jun. 25, 2023 before the Chinese Patent Office with the application number of 202310754197.7 and the title of "GRAYSCALE COMPENSATION METHOD, APPARATUS AND SYSTEM, DISPLAY DRIVING METHOD, APPARATUS AND SYSTEM, AND CHIP AND MEDIUM", which is incorporated herein in its entirety by reference.

TECHNICAL FIELD

The present disclosure relates to the technical field of displaying, and particularly relates to a grayscale compensating method, a displaying driving method, an apparatus, a system, a chip and a medium.

BACKGROUND

OLED (Organic Light Emitting Display) displaying devices have the advantages such as self-illumination, a high response speed, a high contrast, a high color gamut and a wide visual angle, and can be bendable. As compared with LCDs (Liquid-Crystal Displays), the OLEDs do not require a backlight source, and can realize an ultra-low thickness of the displaying devices.

However, currently, in the OLED displaying devices, as restricted by the level of the encapsulating process, the OLED pixel circuits have differences in the TFT characteristics. As a result, under equal inputted data signal voltages, the different pixels output different currents and brightnesses, which causes that the displaying brightness of the entire panel is nonuniform, which affects the quality of displaying of the panel. In the related art, not only compensation is performed by using pixel compensating circuits, but also usually a De-Mura algorithm is used for the compensation. The De-Mura algorithm may perform grayscale compensation to each of the pixels individually. However, when the De-Mura algorithm is used, the problem of brightness nonuniformity of the display panels still exists.

SUMMARY

In the first aspect of the present disclosure, there is provided a grayscale compensating method, wherein the method comprises:

determining compensation coefficients corresponding to a plurality of sub-pixels in a display panel, wherein the compensation coefficients are for characterizing compensation modes and compensation magnitudes of brightness compensations to the sub-pixels, wherein the compensation modes include a mode of increasing a brightness and a mode of reducing a brightness;

based on to-be-displayed grayscale values corresponding to the sub-pixels and the compensation coefficients, determining correction coefficients corresponding to the sub-pixels, wherein unequal instances of the to-be-displayed grayscale values correspond to unequal instances of the correction coefficients, and the correction coefficients are for correcting the compensation magnitudes; and based on the compensation coefficients and the correction coefficients, compensating for the to-be-displayed grayscale values of the plurality of sub-pixels, to reduce a difference in emitted-light brightnesses of the plurality of sub-pixels.

Optionally, the step of, based on the to-be-displayed grayscale values corresponding to the sub-pixels and the compensation coefficients, determining the correction coefficients corresponding to the sub-pixels comprises:

if the compensation coefficients are less than 0, based on the compensation coefficients and the to-be-displayed grayscale values, by using a target condition as a constraint, determining the correction coefficients; and if the compensation coefficients are greater than 0, determining the correction coefficients to be a preset value for maintaining the compensation magnitudes;

wherein the target condition is that post-compensation grayscale values of the sub-pixels are not 0.

Optionally, the method further comprises:

based on the compensation coefficients corresponding to the plurality of sub-pixels, delimiting the display panel into a first displaying region block and a second displaying region block, wherein the compensation coefficients in the first displaying region block are greater than 0, and the compensation coefficients in the second displaying region block are less than 0;

wherein the correction coefficients corresponding to the sub-pixels within the first displaying region block are the preset value for maintaining the compensation magnitudes; and the correction coefficients corresponding to the sub-pixels within the second displaying region block are the correction coefficients that are determined based on the compensation coefficients and the to-be-displayed grayscale values by using the target condition as the constraint.

Optionally, the display panel comprises a first displaying region block and a second displaying region block, the compensation coefficients corresponding to the sub-pixels within the first displaying region block are greater than 0, and the compensation coefficients corresponding to the sub-pixels within the second displaying region block are less than 0; and the step of, based on the to-be-displayed grayscale values corresponding to the sub-pixels and the compensation coefficients, determining the correction coefficients corresponding to the sub-pixels comprises:

for the sub-pixels within the first displaying region block, determining preset correction coefficients corresponding to the to-be-displayed grayscale values in a first preset table to be first correction coefficients corresponding to the sub-pixels within the first displaying region block; and for the sub-pixels within the second displaying region block, determining preset correction coefficients corresponding to the to-be-displayed grayscale values in a second preset table to be second correction coefficients corresponding to the sub-pixels within the second displaying region block.

Optionally, the first correction coefficients are greater than the second correction coefficients.

Optionally, the preset correction coefficients are acquired by using the following steps:

acquiring a testing grayscale value corresponding to the display panel; and by using a target condition as a constraint, based on the testing grayscale value and an coefficient range of the compensation coefficients of the sub-pixels within the displaying region blocks, determining correction coefficients corresponding to the displaying region blocks with the testing grayscale value;

wherein the target condition is that, if the to-be-displayed grayscale values are the testing grayscale value, within the displaying region blocks no sub-pixel exists the post-compensation grayscale value of which is 0.

Optionally, the step of, by using the target condition as the constraint, based on the testing grayscale value and the coefficient range of the compensation coefficients of the sub-pixels within the displaying region blocks, determining the correction coefficients corresponding to the displaying region blocks with the testing grayscale value comprises:

determining a target sub-pixel having a lowest instance of the compensation coefficients from the second displaying region block;

based on the compensation coefficient corresponding to the target sub-pixel and the testing grayscale value, determining a target correction coefficient corresponding to the target sub-pixel when the target condition is satisfied;

determining the target correction coefficient to be a correction coefficient corresponding to the second displaying region block with the testing grayscale value; and based on the target correction coefficient, determining a correction coefficient corresponding to the first displaying region block with the testing grayscale value.

Optionally, the step of, based on the target correction coefficient, determining the correction coefficient corresponding to the first displaying region block with the testing grayscale value comprises:

according to the target correction coefficient, determining an initial correction coefficient corresponding to the first displaying region block with the testing grayscale value;

based on the target correction coefficient and the compensation coefficients corresponding to the sub-pixels within the second displaying region block, compensating for the testing grayscale value, to obtain a first preestimated grayscale value corresponding to the sub-pixels within the second displaying region block;

based on the initial correction coefficient and the compensation coefficients corresponding to the sub-pixels within the first displaying region block, compensating for the testing grayscale value, to obtain a second preestimated grayscale value corresponding to the sub-pixels within the first displaying region block;

acquiring a first actual displaying brightness corresponding to the second displaying region block with the first preestimated grayscale value;

acquiring a second actual displaying brightness corresponding to the first displaying region block with the second preestimated grayscale value; and based on a difference between the first actual displaying brightness and the second actual displaying brightness, updating the initial correction coefficient, to cause a displaying brightness of the first displaying region block and a displaying brightness of the second displaying region block to approach a target displaying brightness.

Optionally, the step of, based on the difference between the first actual displaying brightness and the second actual displaying brightness, correcting the initial correction coefficient comprises:

if an absolute value of the difference is greater than a preset difference and characterizes that a brightness of the first displaying region block is less than a brightness of the second displaying region block, increasing the initial correction coefficient; and if the absolute value of the difference is greater than the preset difference and characterizes that the brightness of the first displaying region block is greater than the brightness of the second displaying region block, reducing the initial correction coefficient.

Optionally, with a same one instance of the to-be-displayed grayscale values, the correction coefficients corresponding to the sub-pixels the compensation coefficients of which are greater than 0 are unequal to the correction coefficients corresponding to the sub-pixels the compensation coefficients of which are less than 0.

Optionally, the correction coefficients are greater than 0 and less than 1.

In the second aspect of the present disclosure, there is provided a displaying driving method, wherein the method is applied in a display panel, the display panel comprises a plurality of sub-pixels, and the method comprises:

for a to-be-displayed frame, determining to-be-displayed grayscale values corresponding to the plurality of sub-pixels;

by using the grayscale compensating method in the first aspect, compensating for the to-be-displayed grayscale values corresponding to the plurality of sub-pixels, to obtain post-compensation grayscale values; and based on the post-compensation grayscale values, driving the plurality of sub-pixels to emit light, to display the to-be-displayed frame.

Optionally, the step of, based on the post-compensation grayscale values, driving the plurality of sub-pixels to emit light comprises:

based on the post-compensation grayscale values corresponding to the plurality of sub-pixels, determining data voltages corresponding to the plurality of sub-pixels;

acquiring compensation voltages corresponding to the plurality of sub-pixels;

compensating for the data voltages based on the compensation voltages, to obtain post-compensation voltages corresponding to the plurality of sub-pixels; and based on the post-compensation voltages corresponding to the plurality of sub-pixels, driving the plurality of sub-pixels to emit light.

In the third aspect of the present disclosure, there is provided a driving chip, wherein the driving chip is applied in a display panel, and the driving chip is configured for implementing the grayscale compensating method in the first aspect, or configured for implementing the displaying driving method in the second aspect.

In the fourth aspect of the present disclosure, there is provided a displaying device, wherein the displaying device comprises a display panel, and the display panel comprises a plurality of sub-pixels;

the displaying device stores compensation coefficients and correction coefficients corresponding to the plurality of sub-pixels;

the compensation coefficients are for characterizing compensation modes and compensation magnitudes of brightness compensations to the sub-pixels, wherein the compensation modes include a mode of increasing a brightness and a mode of reducing a brightness;

the correction coefficients are determined based on the compensation coefficients, the different compensation modes correspond to unequal correction coefficients, and the correction coefficients are for correcting the compensation magnitudes; and if the displaying device is operating in a preset grayscale range, after the to-be-displayed grayscale values of the plurality of sub-pixels have been corrected by using the compensation coefficients and the correction coefficients, in the displaying device no black-block region whose displaying brightness is 0 exists, and with a same one instance of the to-be-displayed grayscale values, displaying brightnesses of the plurality of sub-pixels approach a displaying brightness corresponding to the to-be-displayed grayscale value.

In the fifth aspect of the present disclosure, there is provided a displaying system, wherein the displaying system comprises a grayscale compensating module and a burning module;

the grayscale compensating module is configured for determining displaying parameters corresponding to a first display panel, wherein the displaying parameters include compensation coefficients and correction coefficients corresponding to the sub-pixels, wherein the correction coefficients are determined by using the grayscale compensating method in the first aspect;

the burning module is configured for burning the displaying parameters outputted by the grayscale compensating module into the first display panel and a plurality of second display panels; and the second display panels and the first display panel are fabricated in a same one process flow.

In the sixth aspect of the present disclosure, there is provided a grayscale compensating apparatus, wherein the apparatus comprises:

a compensation-coefficient determining module configured for determining compensation coefficients corresponding to a plurality of sub-pixels in a display panel, wherein the compensation coefficients are for characterizing compensation modes and compensation magnitudes of brightness compensations to the sub-pixels, wherein the compensation modes include a mode of increasing a brightness and a mode of reducing a brightness;

a correction-coefficient determining module configured for, based on to-be-displayed grayscale values corresponding to the sub-pixels and the compensation coefficients, determining correction coefficients corresponding to the sub-pixels, wherein unequal instances of the to-be-displayed grayscale values correspond to unequal instances of the correction coefficients, and the correction coefficients are for correcting the compensation magnitudes; and a compensating module configured for, based on the compensation coefficients and the correction coefficients, compensating for the to-be-displayed grayscale values of the plurality of sub-pixels, to reduce a difference in emitted-light brightnesses of the plurality of sub-pixels.

In the seventh aspect of the present disclosure, there is provided a displaying driving apparatus, wherein the apparatus is applied in a display panel, the display panel comprises a plurality of sub-pixels, and the apparatus comprises:

a grayscale determining module configured for, for a to-be-displayed frame, determining to-be-displayed grayscale values corresponding to the plurality of sub-pixels;

a grayscale compensating module configured for, by using the grayscale compensating method in the first aspect, compensating for the to-be-displayed grayscale values corresponding to the plurality of sub-pixels, to obtain post-compensation grayscale values; and a driving module configured for, based on the post-compensation grayscale values, driving the plurality of sub-pixels to emit light, to display the to-be-displayed frame.

The present disclosure further provides a computer-readable storage medium, wherein a computer program stored therein, when executed by a processor, implements the grayscale compensating method in the first aspect, or the displaying driving method in the second aspect.

The grayscale compensating method according to the present disclosure may comprise: determining compensation coefficients corresponding to a plurality of sub-pixels in a display panel; based on to-be-displayed grayscale values corresponding to the sub-pixels and the compensation coefficients, determining correction coefficients corresponding to the plurality of sub-pixels, wherein the correction coefficients are for correcting the compensation magnitudes; and subsequently, based on the compensation coefficients and the correction coefficients, compensating for the to-be-displayed grayscale values of the plurality of sub-pixels, to reduce a difference in emitted-light brightnesses of the plurality of sub-pixels, wherein the compensation coefficients are for characterizing compensation modes and compensation magnitudes of brightness compensations to the sub-pixels.

The grayscale compensating method provides a more precise solution of grayscale compensation. Particularly, because the compensation modes include the mode of increasing the brightness and the mode of reducing the brightness, the display panel can be roughly delimited into a displaying region whose brightness is required to be increased and a displaying region whose brightness is required to be reduced, wherein the displaying region whose brightness is required to be increased may be referred to as a darkening region, and the displaying region whose brightness is required to be reduced may be referred to as a brightening region. Moreover, after the compensation coefficients of the sub-pixels have been determined, according to the compensation mode, the compensation magnitude and the to-be-displayed grayscale value of each of the sub-pixels, the correction coefficient of each of the sub-pixels is determined specifically. Accordingly, the determination on the correction coefficients does not only refer to the compensation coefficients of the sub-pixels, but also refers to the effect of the response by the to-be-displayed grayscale values to the compensation, so that grayscale compensation can be performed to the sub-pixels in the two aspects of the response by the to-be-displayed grayscale values to the compensation and the compensation coefficients of the sub-pixels. Therefore, at least the magnitudes of the correction coefficients within the brightening region and the correction coefficients within the darkening region are unequal, so the compensation magnitudes of the darkening region and the compensation magnitudes of the brightening region are trimmed at different levels. Accordingly, in the compensation to the sub-pixels, not only the compensation is performed according to the encapsulation characteristics of the sub-pixels (the compensation coefficients), but also the compensation magnitudes are trimmed according to the compensation modes, whereby the compensation is more precise, and the problem of black block caused by overcompensation does not happen. Accordingly, the actual displaying brightnesses of the sub-pixels after the compensation can be close to each other, which increases the uniformity of the displaying brightness of the entire panel.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure will be provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the related art, the De-Mura algorithm is a mode of optical compensation, and mainly comprises the following process:

1) by using a high-resolution camera, collecting the brightnesses of an OLED display screen with unequal grayscales, and removing the moire patterns;
2) according to a corresponding compensation algorithm, processing and operating the brightness data, to generate the corresponding compensation data;
3) according to the compensation data, performing the brightness compensation to the display panel, and re-photographing the frame to confirm that Mura has been removed; and
4) using the corresponding compensation data when Mura has been removed as the compensation coefficients of the sub-pixels.

Particularly, the grayscale compensation to the sub-pixels by using the De-Mura algorithm may be performed by using the formula (1):

$$G_{out} = G_{in} * k + \text{offset} * \text{Gray\_mask} * DBVscaler \qquad \text{formula (1)}$$

In the formula (1), $G_{in}$ is the inputted grayscale, $G_{out}$ is the post-compensation grayscale, and is also referred to as the outputted grayscale, k is a constant quantity, offset is the compensation coefficient obtained by using the De-Mura algorithm, DBVscaler is mainly used to adjust the compensation magnitudes of the other brightnesses, and Gray_mask is the grayscale correction coefficient, and is mainly used for the weak compensation to low grayscales. Regarding a sub-pixel, the offset may be a positive value, and may also be a negative value. If it is a positive value, it characterizes that the grayscale of the sub-pixel is to be increased, i.e., increasing the brightness. If it is a negative value, it characterizes that the grayscale of the sub-pixel is to be reduced, i.e., reducing the brightness.

The De-Mura algorithm has the following problem. Most of the panels have an unsatisfactory uniformity, and, especially, with low grayscales, as influenced by the panel characteristics and the charging duration, the regions of the panel brighten or darken obviously. The compensation can increase the uniformity of the displaying brightness of the display panel to a certain extent. However, with low grayscales, the problem easily happens that overcompensation results in black block within the brightening region.

Figure 1:
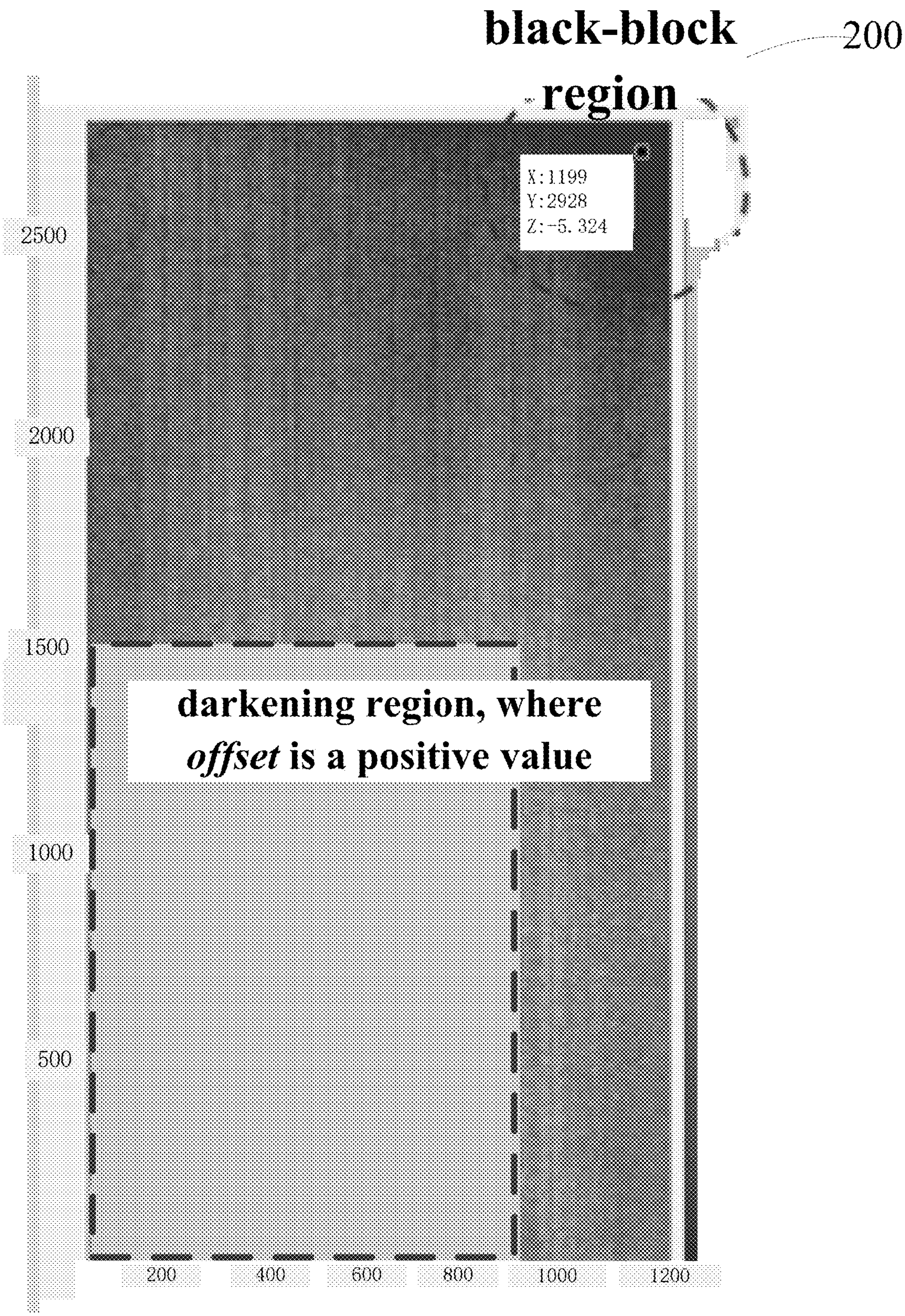
FIG. 1 shows a displayed frame that is compensated for by using the De-Mura algorithm in the related art.

Referring to FIG. 1, FIG. 1 shows a displayed frame that is compensated for by using the De-Mura algorithm in the related art. As shown in FIG. 1, FIG. 1 is a picture of the compensation with the grayscale of 8 (i.e., the Grayout of the pixel points when $Gray_{in}$=8).

It can be seen that, at the position within the brightening region of the display panel, a black-block region appears, for example, the region encircled by the circle in FIG. 1, wherein the darkening region is the region encircled by the dotted-line rectangular block. The $G_{out}$ of the black-block region is a negative value, i.e., the grayscale of 0, and a black block 200 appears.

In order to prevent generation of black block within the brightening region with low grayscales when the De-Mura algorithm is used for the compensation, usually the numerical-value range of the brightening region is reduced, for example, reduced from the original −8~0 to −2~0. However, as a result, when it is required to display with medium and high grayscales, the compensation magnitude of the brightening region is lower, while the compensation magnitude of the darkening region is higher, which deteriorates the displaying uniformity of the display panel with medium and high grayscales.

Therefore, the above-described mode cannot prevent the problem of nonuniform displaying brightness of the display panel when the De-Mura algorithm is used for the compensation.

Figure 2:
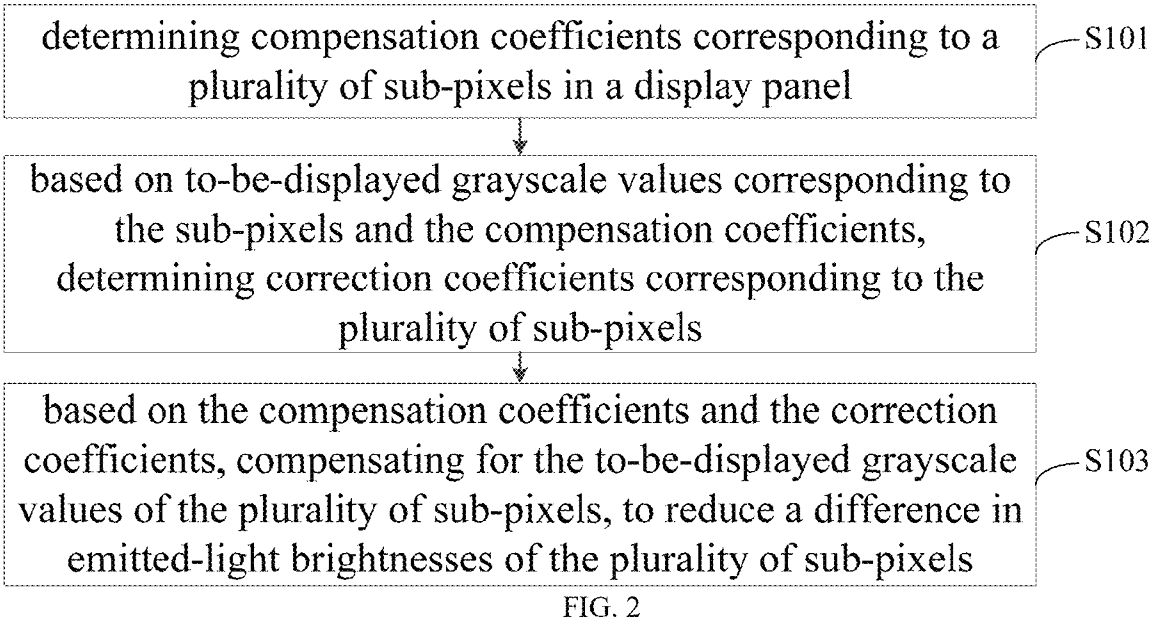
FIG. 2 shows a flow chart of the steps of a grayscale compensating method according to an embodiment of the present disclosure.

In view of the above, the present disclosure provides a grayscale compensating method, wherein the method is applied in a display panel. The display panel may be an OLED display panel. Referring to FIG. 2, FIG. 2 shows a flow chart of the steps of the grayscale compensating method of the display panel. As shown in FIG. 2, the method may particularly comprise the following steps:

Step 101: determining compensation coefficients corresponding to a plurality of sub-pixels in a display panel.

The compensation coefficients are for characterizing the compensation modes and the compensation magnitudes of brightness compensations to the sub-pixels, wherein the compensation modes include the mode of increasing the brightness and the mode of reducing the brightness.

In the present embodiment, the display panel may be an OLED display panel, and, particularly, may include an LTPS (Low-Temperature Polycrystalline Silicon) type display panel. The display panel may comprise a displaying region and a non-displaying region, a plurality of sub-pixels are provided within the displaying region, and the plurality of sub-pixels may be arranged in an array in the display panel. The plurality of sub-pixels may include sub-pixels emitting red light, sub-pixels emitting green light and sub-pixels emitting blue light. In general, one sub-pixel emitting red light, one sub-pixel emitting blue light and one sub-pixel emitting green light form one pixel, which may be understood as one pixel point in the displayed frame.

When the compensation coefficients corresponding to the plurality of sub-pixels in the display panel are being determined, the process may comprise inputting the same one data voltage into all of the sub-pixels in the display panel, controlling the plurality of sub-pixels to emit light under the same one data voltage, and photographing the displayed frame by using a high-resolution camera. It should be noted that, usually, the displayed frames of the display panel with unequal grayscales are collected by using the high-resolution camera, i.e., the displayed frames of the display panel when unequal data voltages are inputted. Subsequently, the process may comprise, according to the result of the photographing, by using a corresponding compensation algorithm, processing and operating the brightness data obtained by the photographing, to generate the corresponding compensation data, so as to obtain the compensation coefficients of the sub-pixels. The compensation coefficients are related to the electric characteristics and the encapsulating process of the sub-pixels, and, therefore, the compensation coefficients corresponding to the sub-pixels may be understood as constant values, and do not vary with the brightnesses that they are to display and so on.

The compensation coefficients may characterize the compensation modes and magnitudes of the sub-pixels, and the compensation modes may include the mode of increasing the brightness and the mode of reducing the brightness. In the mode of increasing the brightness, that characterizes that the emitted-light brightness of the sub-pixel is greater than the expected brightness, and therefore it is required to reduce its brightness. In the mode of reducing the brightness, that characterizes that the emitted-light brightness of the sub-pixel is less than the expected brightness, and therefore it is required to increase its brightness.

The region where the sub-pixels whose brightnesses are required to be reduced are located may be referred to as a brightening region, and the region where the sub-pixels whose brightnesses are required to be increased are located may be referred to as a darkening region. Generally, regarding the brightening region, its compensation coefficients are generally negative numbers; in other words, it is required to reduce the to-be-displayed grayscale values. Accordingly, in the case in which the to-be-displayed grayscale values are low, they might be reduced to 0, and, therefore, black block easily appears. Regarding the darkening region, its compensation coefficients are generally positive numbers.

The magnitude of the compensation coefficient is used to characterize the compensation magnitude, and whether the compensation coefficient is greater than 0 characterizes the compensation mode. If it is greater than 0, that indicates that it is required to increase the brightness. If it is less than 0, that indicates that it is required to reduce the brightness. If it is greater than 0, if the compensation coefficient is higher, the compensation magnitude is higher. If it is less than 0, if the absolute value of the compensation coefficient is higher, the compensation magnitude is higher.

Step 102: based on to-be-displayed grayscale values corresponding to the sub-pixels and the compensation coefficients, determining correction coefficients corresponding to the plurality of sub-pixels.

Unequal to-be-displayed grayscale values correspond to unequal correction coefficients, and the correction coefficients are used to correct the magnitudes of the brightness compensations.

It can be known from above that, regarding the brightening region, with some to-be-displayed grayscale values, after the sub-pixels have been compensated for according to the compensation coefficients, black block might appear. In order to prevent that, the compensation magnitudes of the brightening region may be reduced, and, in order not to affect the compensation magnitudes of the darkening region, the correction coefficients of the brightening region and the darkening region are required to be unequal.

Regarding the sub-pixels within the brightening region, the compensation coefficients are negative numbers, and, usually, by using the correction coefficients, excessively high compensation magnitudes of the brightening region are prevented, to prevent black block. However, whether black block appears is not only related to the compensation coefficients, but also is related to the to-be-displayed grayscale values of the sub-pixels, and, in the case in which the to-be-displayed grayscale values are low, for example, below the grayscale of 16, the probability with which black block appears is high. In some embodiments, the correction coefficients may be determined by using the compensation coefficients and the to-be-displayed grayscale values, whereby, when any one of the to-be-displayed grayscale values is inputted, after the correction using the dynamic correction coefficient, black block does not appear within the brightening region. Moreover, regarding the darkening region, it can maintain the effect of the correction thereto using the compensation coefficients. In other words, regarding the sub-pixels whose compensation coefficients are negative numbers, no matter which to-be-displayed grayscale value is inputted, it can be prevented, by determining a corresponding correction coefficient, that black block appears with the to-be-displayed grayscale value. For example, if the inputted to-be-displayed grayscale value is any one of the grayscale values of 1-32, a corresponding correction coefficient is determined, to prevent that black block appears within the brightening region.

Accordingly, no matter what type of the displayed frame is inputted into the display panel, the uniformity of the frame brightness of the display panel can be increased.

In an example, according to whether the compensation coefficient of a sub-pixel is greater than 0, the corresponding correction coefficient may be determined. If it is greater than 0, that indicates that it is within the darkening region, and, in order to prevent influencing the compensation magnitudes of the darkening region, the correction coefficients of the darkening region may be determined according to the to-be-displayed grayscale values. If it is less than 0, that indicates that it is within the brightening region, and, in order to prevent black block, it is required to reduce the compensation magnitudes. Therefore, the correction coefficients with respect to the brightening region may be provided, wherein the correction coefficients may be values between 0 and 1. In practice, the correction coefficients corresponding to the sub-pixels whose compensation coefficients are less than 0 may be determined according to the to-be-displayed grayscale values and the compensation coefficients jointly.

With the same one to-be-displayed grayscale value, the correction coefficients of the darkening region may be greater than the correction coefficients of the brightening region. In such examples, for the sub-pixels the compensation coefficients of which are less than 0, the correction coefficients corresponding thereto may be determined according to the to-be-displayed grayscale values, wherein if the to-be-displayed grayscale value is higher, the correction coefficient may be higher. For the sub-pixels the compensation coefficients of which are greater than 0, the correction coefficients corresponding thereto may be a preset constant value, for example, preset to be 0.8, 1 and so on, and it is merely required to ensure that, with a same one to-be-displayed grayscale value, it is greater than the correction coefficients corresponding to the sub-pixels whose compensation coefficients are less than 0, and the difference in the displaying brightnesses of them is low.

In another example, if the compensation mode is increasing the brightness (the compensation coefficient is greater than 0), the correction coefficient may be set to be a value greater than or equal to 1 according to the magnitude of the compensation magnitude. In such a case, if the value of the compensation coefficient of a sub-pixel is higher, the correction coefficient corresponding thereto may be lower.

If the compensation mode is reducing the brightness, the correction coefficient may be set to be a value less than 1 according to the magnitude of the compensation magnitude. In such a case, the compensation coefficient is less than 0, and, with the same one to-be-displayed grayscale, if the absolute value of the compensation coefficient of a sub-pixel is higher, the correction coefficient corresponding thereto may be lower.

It should be noted that, in one displayed frame, regarding two sub-pixels whose compensation coefficients are greater than 0, when unequal to-be-displayed grayscale values are inputted, the correction coefficients that are determined with respect to the two sub-pixels may be unequal.

Step 103: based on the compensation coefficients and the correction coefficients, compensating for the to-be-displayed grayscale values of the plurality of sub-pixels, to reduce a difference in emitted-light brightnesses of the plurality of sub-pixels.

In the present embodiment, after the compensation coefficient and the correction coefficient corresponding to each of the sub-pixels have been determined, the to-be-displayed grayscale value of the sub-pixel may be compensated for according to the following formula (2):

$$G_{out} = G_{in} * k + \text{offset} * \text{Gray\_mask} * DBVscaler. \qquad \text{formula (2)}$$

In the formula (2), $G_{out}$ represents the post-compensation grayscale value, $G_{in}$ represents the to-be-displayed grayscale value, offset represents the compensation coefficient, Gray_mask represents the correction coefficient, k is a constant quantity, and DBVscaler is mainly used to adjust the compensation magnitudes of the other brightnesses, and may be referred to as an adjustment coefficient.

The to-be-displayed grayscale value refers to the grayscale value that a sub-pixel is required to display. For example, if it is required that a sub-pixel displays the 32 grayscale, then it is required to input into the sub-pixel the data voltage corresponding to the brightness of the 32 grayscale. However, because of the electric characteristics of the sub-pixel and objective factors caused by the encapsulating process, the emitted-light brightness of the sub-pixel under the data voltage corresponding to the brightness of the 32 grayscale is not the brightness corresponding to the 32 grayscale. Therefore, after the compensation has been performed by using the compensation coefficient and the correction coefficient, $G_{out}$ can be obtained, and, after the data voltage corresponding to $G_{out}$ has been inputted into the sub-pixel, the emitted-light brightness of the sub-pixel can be the brightness corresponding to the 32 grayscale. Accordingly, all of the emitted-light brightnesses of the sub-pixels of the display panel can be caused to be the brightness corresponding to the 32 grayscale, which increases the brightness uniformity.

In an example, if the to-be-displayed grayscale value is in a low-grayscale range, the to-be-displayed grayscale value of the sub-pixel may be compensated for according to the correction coefficient and the compensation coefficient. Moreover, if the to-be-displayed grayscale value is in a medium-high-grayscale range, the to-be-displayed grayscale value of the sub-pixel may be compensated for directly according to the compensation coefficient. Because the difference in the brightnesses of the sub-pixels decreases with the increasing of the grayscales, with medium and high grayscales, by selecting the compensation coefficient for the compensation, the problem can be prevented of the excessive calculation when the medium and high grayscales are compensated for according to the correction coefficients, to increase the frame response efficiency.

By using the technical solution of the present embodiment, because the compensation modes include the mode of increasing the brightness and the mode of reducing the brightness, the region where the sub-pixels whose brightnesses are increased are located may be referred to as the darkening region, the displaying region whose brightness is required to be reduced may be referred to as the brightening region, and the sub-pixels within the darkening region and the sub-pixels within the brightening region can be compensated for separately. Subsequently, in the process of, based on the compensation coefficients and the to-be-displayed grayscale values corresponding to each of the sub-pixels, determining the correction coefficients, the magnitudes of the values of the correction coefficients corresponding to unequal to-be-displayed grayscale values are unequal. Accordingly, at least the correction coefficients of the brightening region and the correction coefficients of the darkening region are unequal with unequal to-be-displayed grayscale values. Therefore, the compensation magnitudes of the darkening region and the compensation magnitudes of the brightening region are trimmed separately. Accordingly, in the compensation to the sub-pixels, not only the compensation is performed according to the encapsulation characteristics (the compensation coefficients), but also the compensation magnitudes are trimmed according to the compensation modes, whereby the compensation is more precise. Accordingly, the actual displaying brightnesses of the sub-pixels after the compensation can be close to each other, thereby preventing the problem of nonuniform displaying brightness of the entire panel.

In an example, in order to prevent overcompensation of the emitted-light brightnesses of the sub-pixels, the correction coefficients are greater than 0 and less than 1. In such examples, no matter what the to-be-displayed grayscale value is, the correction coefficients corresponding to the sub-pixels are greater than 0 and less than 1. Furthermore, all of the correction coefficients corresponding to the sub-pixels the compensation coefficients of which are greater than 0 and the correction coefficients corresponding to the sub-pixels the compensation coefficients of which are less than 0 are in the range of 0-1.

In an example, with the same one to-be-displayed grayscale value, the correction coefficients corresponding to the sub-pixels the compensation coefficients of which are greater than 0 are unequal to the correction coefficients corresponding to the sub-pixels the compensation coefficients of which are less than 0. However, all of the correction coefficients of them may be values between 0 and 1.

In another example, with the same one to-be-displayed grayscale value, the correction coefficients corresponding to the sub-pixels the compensation coefficients of which are greater than 0 may also be equal to the correction coefficients corresponding to the sub-pixels the compensation coefficients of which are less than 0. However, such a case is more suitable for situations having special demands, and such a case should not be considered as a limitation on the present disclosure.

In an embodiment, dynamic grayscale compensation may be performed to the displayed frames of the display panel. Particularly, the correction coefficients corresponding to the sub-pixels may be dynamically calculated in real time during the frame displaying by the display panel.

Particularly, the process comprises, for the sub-pixels the compensation coefficients of which are less than 0, based on the compensation coefficients and the to-be-displayed grayscale values, by using a target condition as a constraint, determining the correction coefficients; and for the sub-pixels the compensation coefficients of which are greater than 0, determining the correction coefficients to be a preset value for maintaining the compensation magnitudes;

wherein the target condition is that post-compensation grayscale values of the sub-pixels are not 0.

In the present embodiment, regarding each of the sub-pixels whose compensation coefficients are less than 0, the process may comprise, according to the compensation coefficient of the sub-pixel and the to-be-displayed grayscale value of the sub-pixel, determining the correction coefficient corresponding to the case in which the post-compensation grayscale value obtained after the to-be-displayed grayscale value has been compensated for is not 0. Accordingly, regarding the same one sub-pixel whose compensation coefficient is less than 0, it, with unequal to-be-displayed grayscale values, corresponds to unequal correction coefficients.

Taking the formula (2) as an example, if the to-be-displayed grayscale value is known and the compensation coefficient is known, the correction coefficient when the post-compensation grayscale value $G_{out}$ is not 0 can be obtained. Particularly, the process may comprise firstly determining the correction coefficient when the post-compensation grayscale value $G_{out}$ is 0, and subsequently determining a value less than the correction coefficient to be the correction coefficient of the sub-pixel. The value less than the correction coefficient may be the difference between the correction coefficient and a preset coefficient, wherein the preset coefficient may be set in advance, for example, set to be 0.1 or 0.05.

As an example, if the to-be-displayed grayscale value of a sub-pixel A is 8 and the compensation coefficient is −8, then, according to the formula (2), it is determined that the correction coefficient when $G_{out}$ is 0 is 0.9. Accordingly, it is required to determine the correction coefficient of the sub-pixel A to be a value less than 0.9, and, if the preset coefficient is 0.05, then the correction coefficient of the sub-pixel A may be determined to be 0.85.

As another example, if the to-be-displayed grayscale value of a sub-pixel B is 8 and the compensation coefficient is −4, then, according to the formula (2), it is determined that the correction coefficient when $G_{out}$ is 0 is 1.8. Accordingly, it is required to determine the correction coefficient of the sub-pixel B to be a value less than 1.8, and, if the preset coefficient is 0.05, then the correction coefficient of the sub-pixel A may be determined to be 1.75.

Certainly, in order to prevent overcompensation of the sub-pixels by the correction coefficients, the correction coefficients corresponding to the sub-pixels whose compensation coefficients are less than 0 may be values between 0 and 1. Furthermore, in another example, the method may comprise, by using the correction coefficient corresponding to the sub-pixel having the lowest compensation coefficient with the same one to-be-displayed grayscale value when the target condition is satisfied as the reference, determining the correction coefficients corresponding to the other sub-pixels whose compensation coefficients are less than 0 with the same one to-be-displayed grayscale value, whereby the difference in the correction coefficients of them is less than a preset difference. As in the above examples, the compensation coefficient of the sub-pixel A is the lowest, and its correction coefficient with the grayscale of 8 is 0.85. Accordingly, the correction coefficients of the sub-pixels whose compensation coefficients are greater than that of the sub-pixel A and less than 0 with the grayscale of 8 may be also determined to be 0.85, or determined to be correction coefficients slightly greater than 0.85.

Regarding each of the sub-pixels whose compensation coefficients are greater than 0, that indicates that it is required to increase the brightness of the sub-pixel, and accordingly the sub-pixel is located within the darkening region. In practice, it is required to compensate for the brightness of the darkening region, to increase the brightness of the darkening region. In order to ensure that the brightness compensation of the darkening region is not affected, the correction coefficient of each of the sub-pixels whose compensation coefficients are greater than 0 may be determined to be a preset value for maintaining the magnitude of the brightness compensation of the darkening region. If the compensation coefficient is to be maintained to be constant, then the preset value may be 1. If the compensation coefficient is to be maintained to be substantially constant, then the preset value may be set to be a value slightly less than 1, for example, 0.9.

Accordingly, the compensation correction on the sub-pixels within the brightening region and the compensation correction on the sub-pixels within the darkening region may be independent of each other.

By using the technical solution of the present embodiment, when each of the frames of the displayed frames comes, the to-be-displayed grayscale values of the sub-pixels can be calculated in real time. Subsequently, regarding the sub-pixels within the brightening region, according to the to-be-displayed grayscale values and the compensation coefficients of the sub-pixels within the brightening region, by using the target condition as the constraint, the correction coefficients corresponding to the sub-pixels can be dynamically determined. Moreover, regarding the darkening region, the correction coefficients may be determined to be 1, and, subsequently, according to the compensation coefficients and the correction coefficients corresponding to the sub-pixels, the to-be-displayed grayscale values of the sub-pixels are compensated for.

Accordingly, the display panel can dynamically adjust the to-be displayed displayed frame, whereby, no matter what type of the displayed frame is inputted, the uniformity of the frame brightness of the display panel can be increased. In other words, no matter what to-be-displayed grayscale value a sub-pixel is having, for example, when it is having a very low to-be-displayed grayscale value, it can be prevented, by using the correction coefficient corresponding to the sub-pixel, that the sub-pixel becomes a black dot to affect the frame displaying. Accordingly, by using each of the sub-pixels as the granularity, the precision degree of the controlling over the frame uniformity is improved.

In another embodiment, the compensation coefficients may characterize the compensation modes and the compensation magnitudes of the sub-pixels, wherein the compensation modes may be used to define the sub-pixels to be brightening sub-pixels and darkening sub-pixels. In practice, based on the fabricating process and the encapsulating process of the display panel, usually the brightening sub-pixels have a regional distribution, and the darkening sub-pixels also have a regional distribution. For example, as shown in FIG. 1, the darkening sub-pixels are locally distributed at the bottom left corner of the panel, and the brightening sub-pixels are locally distributed at the top right corner of the panel. Therefore, the display panel may be delimited into a plurality of displaying region blocks of unequal brightnesses according to the compensation coefficients, wherein the correction coefficients corresponding to the different sub-pixels located within the same one displaying region block may be equal.

In an alternative example, the method may comprise, based on the compensation coefficients corresponding to the plurality of sub-pixels, delimiting the display panel into a plurality of displaying region blocks, and, regarding the sub-pixels located within each of the displaying region blocks, determining the correction coefficient corresponding to that displaying region block to be the correction coefficient corresponding to the sub-pixels. The different displaying region blocks correspond to the emitted-light brightnesses of unequal levels, and a displaying region block of a higher brightness corresponds to a lower correction coefficient.

In a delimitation mode according to the present example, the display panel may, directly according to whether the compensation coefficient is greater than 0, be delimited into two large displaying region blocks, to obtain a first displaying region block and a second displaying region block, wherein the first displaying region block is defined as the darkening region, and the second displaying region block is defined as the brightening region. In other words, the compensation coefficients corresponding to the sub-pixels within the first displaying region block are greater than 0, and the compensation coefficients corresponding to the sub-pixels within the second displaying region block are less than 0.

Figure 3:
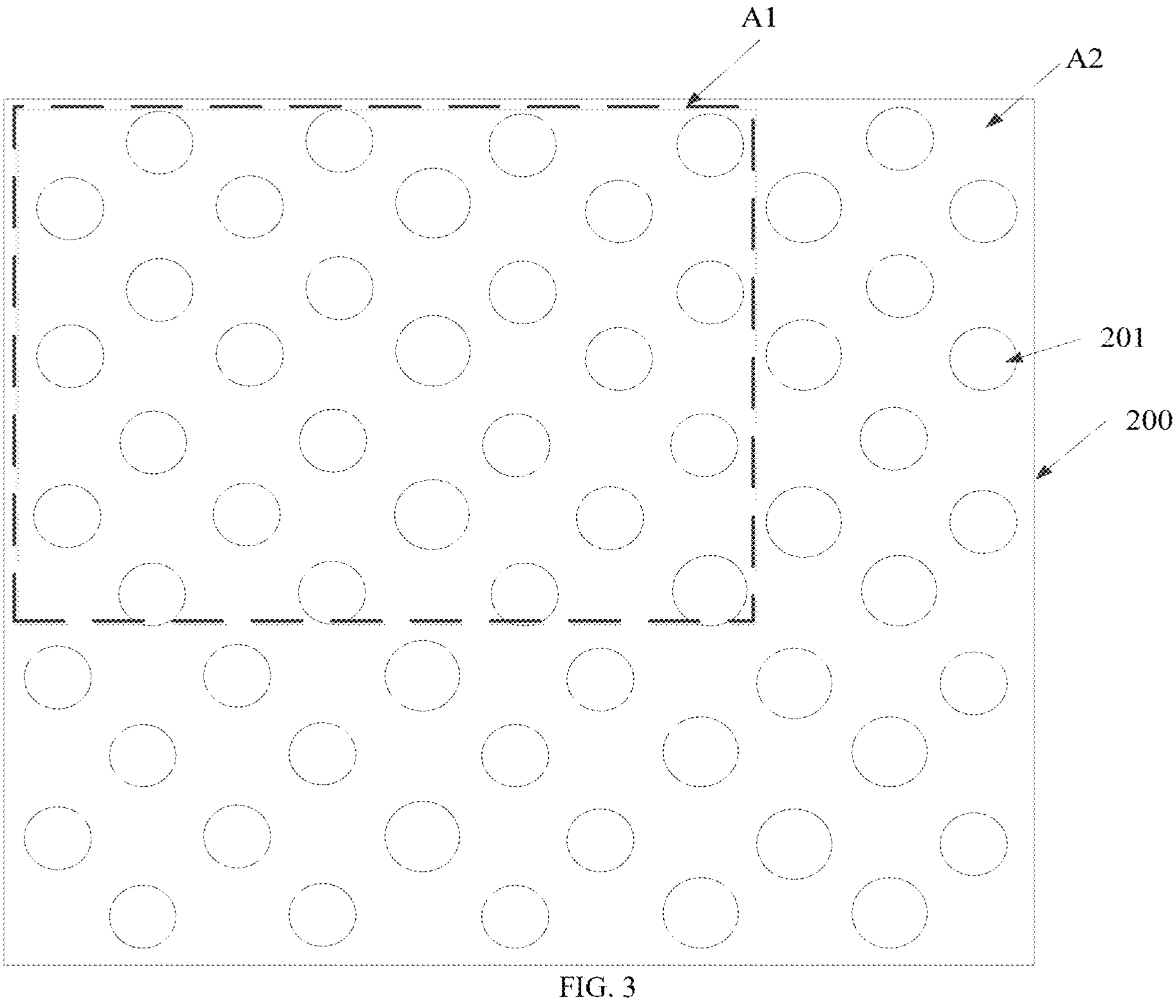
FIG. 3 shows a schematic plan view of displaying regions obtained by delimitation.

Referring to FIG. 3, FIG. 3 shows a schematic plan view of the displaying regions obtained by the delimitation in this type of the delimitation mode. As shown in FIG. 3, based on whether the compensation coefficient is greater than 0, the display panel 200 is delimited into the brightening region and the darkening region, wherein the brightening region is the first displaying region block A1, and the darkening region is the second displaying region block A2. Each of the brightening region and the darkening region contains a plurality of sub-pixels 201.

After the displaying region blocks have been obtained, the correction coefficients corresponding to the displaying region blocks may be determined by using the following process:

In an example, the correction coefficients corresponding to the sub-pixels within the first displaying region block are the preset value for maintaining the compensation magnitudes. The correction coefficients corresponding to the sub-pixels within the second displaying region block are the correction coefficients that are determined based on the compensation coefficients and the to-be-displayed grayscale values by using the target condition as the constraint.

In the present example, the same to-be-displayed grayscale value is inputted into the plurality of sub-pixels of the display panel. Regarding the second displaying region block, the correction coefficient of each of the sub-pixels within the second displaying region block with the same one to-be-displayed grayscale value when the target condition is satisfied may be determined, and subsequently the correction coefficient is stored as the correction coefficient with the to-be-displayed grayscale value; Regarding the first displaying region block, the correction coefficients may be determined to be the preset value for maintaining the compensation magnitudes with the same one to-be-displayed grayscale value.

In other words, in the determination on the correction coefficients corresponding to the sub-pixels, the correction coefficients corresponding to the sub-pixels within the first displaying region block may be determined via one path, and the correction coefficients corresponding to the sub-pixels within the second displaying region block may be determined via another path, so as to ensure the separate compensation of the brightening region and the darkening region.

In another example, before the display panel leaves factory, the correction coefficients of the sub-pixels within the displaying region blocks may be determined, and the correction coefficients of the different displaying region blocks may be stored into different preset tables. Subsequently, when it is required to display the frames, the correction coefficients of the sub-pixels with unequal to-be-displayed grayscale values may be read directly from the corresponding preset tables. Accordingly, it is not required to calculate the correction coefficients when each of the frames of the displayed frames is being displayed, but the correction coefficients corresponding to the displaying region blocks can be read directly, to correct the emitted-light brightnesses of the sub-pixels.

Correspondingly, the step of, based on the to-be-displayed grayscale values corresponding to the sub-pixels and the compensation coefficients, determining the correction coefficients corresponding to the sub-pixels comprises:

for the sub-pixels within the first displaying region block, determining preset correction coefficients corresponding to the to-be-displayed grayscale values in a first preset table to be first correction coefficients corresponding to the sub-pixels within the first displaying region block; and for the sub-pixels within the second displaying region block, determining preset correction coefficients corresponding to the to-be-displayed grayscale values in a second preset table to be second correction coefficients corresponding to the sub-pixels within the second displaying region block.

The first preset table stores the preset correction coefficients corresponding to unequal to-be-displayed grayscale values of the first displaying region block, and the second preset table stores the preset correction coefficients corresponding to unequal to-be-displayed grayscale values of the second displaying region block.

When a displayed frame comes, it may be firstly determined, based on whether the compensation coefficient of a sub-pixel is greater than 0, whether it is located within the first displaying region block or the second displaying region block. If it is located within the first displaying region block, then the preset correction coefficient corresponding to the current to-be-displayed grayscale value may be acquired from the first preset table, and the preset correction coefficient is determined to be the first correction coefficient corresponding to the sub-pixel. If it is located within the second displaying region block, then the preset correction coefficient corresponding to the current to-be-displayed grayscale value may be acquired from the second preset table, and the preset correction coefficient is determined to be the second correction coefficient corresponding to the sub-pixel.

In some embodiments, with the same one to-be-displayed grayscale, the first correction coefficients may be greater than the second correction coefficients, to ensure that the compensation to the darkening region does not affect the compensation to the brightening region. All of the first correction coefficients and the second correction coefficients may be values between 0 and 1.

How to obtain the preset correction coefficients corresponding to the unequal to-be-displayed grayscale values before factory leaving will be described below:

Before the factory leaving, a testing grayscale value may be introduced. The testing grayscale value is a grayscale value inputted into the plurality of sub-pixels of the display panel, and it may be used to test the data of the displaying brightnesses of the plurality of sub-pixels of the display panel after being compensated for based on the compensation coefficients when they are inputted the same one testing grayscale value, and, according to the data of the displaying brightnesses, determine the correction coefficients corresponding to the sub-pixels with the testing grayscale value.

The testing grayscale value is used to represent the grayscale when the display panel does not have black block within the brightening region (i.e., the to-be-displayed grayscale value). For example, if it is required that, when the display panel is at the grayscale of 8, the brightening region does not have black block, then the testing grayscale value is 8. In other words, when the inputted to-be-displayed grayscale value is 8, after the sub-pixels within the brightening region have been compensated for by using the correction coefficients and the compensation coefficients, their post-compensation grayscale values are not 0. If the testing grayscale value is lower, that indicates that it is required to ensure the uniformity of the frame brightness of the display panel with a lower grayscale.

The testing grayscale value may be decided according to practical demands. It should be noted that the testing grayscale value may be set to be a grayscale in the low-grayscale range, for example, set to be a grayscale of 0-32.

In another example, the correction coefficient corresponding to a displaying region block with the testing grayscale value may be determined according to the testing grayscale value and the lowest compensation coefficient within the displaying region block.

In particular implementations, the method may comprise:

determining a target sub-pixel having a lowest instance of the compensation coefficients from the second displaying region block;

based on the compensation coefficient corresponding to the target sub-pixel and the testing grayscale value, determining a target correction coefficient corresponding to the target sub-pixel when the target condition is satisfied;

determining the target correction coefficient to be a correction coefficient corresponding to the second displaying region block with the testing grayscale value; and based on the target correction coefficient, determining the correction coefficient corresponding to the sub-pixels located within the first displaying region block.

As stated above, the testing grayscale value is used to represent the grayscale when the display panel does not have black block within the brightening region, which may be understood as the minimum grayscale when the brightening region does not have black block. Accordingly, the target condition may be that, when the same one to-be-displayed grayscale value is inputted into each of the sub-pixels within a displaying region block, after the correction using the compensation coefficients and the correction coefficients, black block does not appear within the displaying region block.

Because the displaying region blocks contain a plurality of sub-pixels, and different sub-pixels correspond to unequal compensation coefficients, in order that the second displaying region block satisfies the target condition, it is required to, by using the sub-pixel of the lowest compensation coefficient within the second displaying region block as the basis, determine the correction coefficient of the sub-pixels within the second displaying region block.

Regarding the first displaying region block, whose compensation coefficients are greater than 0, no matter what to-be-displayed grayscale value is inputted, the compensation coefficients are for the purpose of increasing the displaying brightnesses. Therefore, no matter whether the correction coefficient is provided, the target condition is satisfied. Accordingly, the correction coefficient may be determined according to the determined correction coefficient of the second displaying region block, so as to ensure that, after the grayscale compensation to the second displaying region block and the first displaying region block, they do not have a large difference in the displaying brightnesses.

Regarding the second displaying region block, whose compensation coefficients are less than 0, it is required to reduce the emitted-light brightness based on the to-be-displayed grayscale value. Accordingly, the target sub-pixel having the lowest compensation coefficient within the second displaying region block may be determined, and the target correction coefficient of the sub-pixel with the testing grayscale value when the target condition is satisfied is determined to be the correction coefficient of the second displaying region block with the testing grayscale value.

As an example, as shown in FIG. 3, it is assumed that the testing grayscale value is 8, the sub-pixel B within the second displaying region block is the sub-pixel having the lowest compensation coefficient, and its compensation coefficient is −8. Accordingly, according to the formula (2), it is determined that the correction coefficient of the sub-pixel B, when its inputted grayscale is the testing grayscale value and its outputted grayscale $G_{out}$ is 0, is 0.9, and the 0.9 is the highest correction coefficient within the second displaying region block. In practice, the correction coefficients of the sub-pixels within the second displaying region block whose compensation coefficients are −8 are required to be less than 0.9, so that black dot does not appear. Accordingly, it is required to determine the correction coefficient of the second displaying region block when the testing grayscale value is 8 to be a value less than 0.9, for example, which may as 0.85, and, accordingly, the correction coefficient corresponding to the second displaying region block with the testing grayscale value may be 0.85.

It should be noted that, after the sub-pixels of the display panel have been delimited into the region blocks according to the compensation coefficients, the correction coefficient corresponding to the second displaying region block with one testing grayscale value is shared by the plurality of sub-pixels within the second displaying region block. In other words, if the correction coefficient corresponding to the grayscale of 8 of the second displaying region block is 0.85, then all of the correction coefficients corresponding to the sub-pixels located within the second displaying region block with the grayscale of 8 are 0.85.

Subsequently, the correction coefficient of the first displaying region block with the testing grayscale value may be the correction coefficient corresponding to the second displaying region block with the testing grayscale value, so as to ensure that, while, with the testing grayscale value, the sub-pixel of the highest compensation magnitude (the compensation coefficient is negative and the lowest) within the brightening region does not have black dot, the grayscale compensation to the darkening region is not affected.

By using the technical solutions of the above embodiments, the correction coefficients corresponding to the displaying region blocks with the testing grayscale value may be determined before the display panel leaves factory. Before the factory leaving, the frame displayed by the display panel with a given testing grayscale value may be photographed at a high resolution, and, after the compensation to the testing grayscale value according to the correction coefficients and the compensation coefficients, the frame displayed by the display panel may be photographed at a high resolution, so as to determine the reasonableness of the correction coefficients of the displaying region blocks, whereby, according to the uniformities of the displaying brightnesses of the frames obtained by the photographing, the correction coefficients of the displaying region blocks are trimmed. After the trimming, the correction coefficients corresponding to each of the displaying region blocks with the unequal testing grayscale values may be stored into the corresponding preset tables. Accordingly, in the practical frame displaying, the display panel may, directly according to whether the compensation coefficient of a sub-pixel is greater than 0, read the correction coefficient corresponding to the current to-be-displayed grayscale value of the sub-pixel from the corresponding preset table, and, subsequently, according to the compensation coefficient and the correction coefficient of the sub-pixel, compensate for the current to-be-displayed grayscale value of the sub-pixel.

Figure 4:
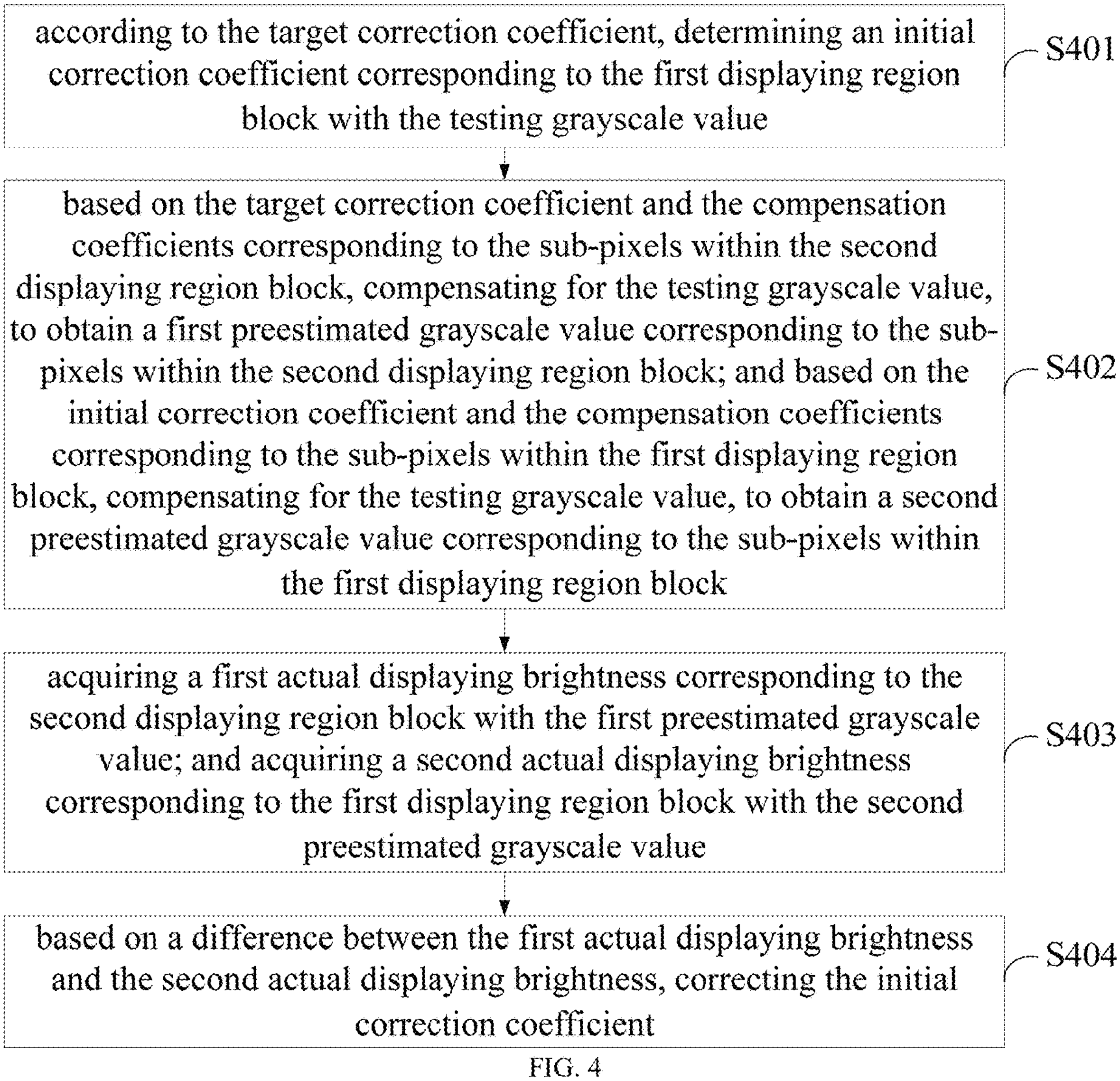
FIG. 4 shows a schematic flow chart of the steps of determination on the correction coefficients according to an embodiment of the present disclosure.

Referring to FIG. 4, FIG. 4 shows a schematic flow chart of the steps of determination on the correction coefficients. As shown in FIG. 4, the step of determining the correction coefficient of the first displaying region block may particularly comprise the following steps:

Step S401: according to the target correction coefficient, determining an initial correction coefficient corresponding to the first displaying region block with the testing grayscale value.

In the present embodiment, one corresponding initial correction coefficient with the testing grayscale value may be determined for the first displaying region block based on the target correction coefficient, wherein the initial correction coefficient may be greater than the target correction coefficient.

Step S402: based on the target correction coefficient and the compensation coefficients corresponding to the sub-pixels within the second displaying region block, compensating for the testing grayscale value, to obtain a first preestimated grayscale value corresponding to the sub-pixels within the second displaying region block; and based on the initial correction coefficient and the compensation coefficients corresponding to the sub-pixels within the first displaying region block, compensating for the testing grayscale value, to obtain a second preestimated grayscale value corresponding to the sub-pixels within the first displaying region block.

In the present embodiment, regarding the plurality of sub-pixels in the display panel, by using the same one testing grayscale value as the grayscale input, the testing grayscale value is compensated for according to the compensation coefficients and the correction coefficients corresponding to the sub-pixels. As an example, regarding the sub-pixels located within the second displaying region block, the testing grayscale value is compensated for according to the compensation coefficients corresponding to the sub-pixels and the target correction coefficient, to obtain the first preestimated grayscale value corresponding to each of the sub-pixels within the second displaying region block.

Regarding the sub-pixels located within the first displaying region block, the testing grayscale value is compensated for according to the compensation coefficients corresponding to the sub-pixels and the initial correction coefficient, to obtain the second preestimated grayscale value corresponding to each of the sub-pixels within the first displaying region block.

Particularly, the compensation may be performed according to the formula (2), wherein the first preestimated grayscale value and the second preestimated grayscale value are the $G_{out}$ in the formula (2).

Step S403: acquiring a first actual displaying brightness corresponding to the second displaying region block with the first preestimated grayscale value; and acquiring a second actual displaying brightness corresponding to the first displaying region block with the second preestimated grayscale value.

After the first preestimated grayscale value corresponding to each of the sub-pixels within the second displaying region block and the second preestimated grayscale value corresponding to each of the sub-pixels within the first displaying region block have been obtained, the corresponding data voltages may be provided to the sub-pixels within the second displaying region block according to the first preestimated grayscale value of the sub-pixels within the second displaying region block, to drive the sub-pixels within the second displaying region block to emit light.

Likewise, the corresponding data voltages may be provided to the sub-pixels within the first displaying region block according to the second preestimated grayscale value of the sub-pixels within the first displaying region block, to drive the sub-pixels within the first displaying region block to emit light.

Subsequently, the process may comprise performing image collection to the display panel, and performing brightness analysis to the collected image, to obtain the first actual displaying brightness corresponding to the second displaying region block with the first preestimated grayscale value; and acquiring a second actual displaying brightness corresponding to the first displaying region block with the second preestimated grayscale value.

The process may comprise acquiring the grayscale values of the pixel points in the collected image, subsequently, for each of the displaying region blocks, determining the average value of the grayscale values of the pixel points within the displaying region block, and using the average value as the actual displaying brightness of the displaying region block.

Step S404: based on a difference between the first actual displaying brightness and the second actual displaying brightness, correcting the initial correction coefficient, to cause a displaying brightness of the first displaying region block and a displaying brightness of the second displaying region block to approach a target displaying brightness.

Accordingly, the correction coefficient corresponding to the first displaying region block with the testing grayscale value can be obtained.

The second actual displaying brightness and the first actual displaying brightness of the first displaying region block may be compared to obtain the difference therebetween. The actual displaying brightnesses may be expressed as the average value of the grayscale values of the pixel points within the displaying region block, and therefore the difference obtained by comparing the first actual displaying brightness and the second actual displaying brightness may refer to the difference in the grayscale values. If the difference is high, that characterizes that, after the first displaying region block has been compensated for according to the initial correction parameters, the displaying brightnesses of it and the second displaying region block have a high difference therebetween. Therefore, it is required to adjust the amplitude of the correction on the compensation magnitude of the first displaying region block, for example, reducing or increasing the initial correction coefficient.

In practice, after the initial correction coefficient has been corrected according to the difference between the first actual displaying brightness and the second actual displaying brightness, the process of the steps S601-S603 may be repeated, till the difference between the first actual displaying brightness and the second actual displaying brightness is less than a preset difference. Accordingly, when the difference between the first actual displaying brightness and the second actual displaying brightness is less than the preset difference, the displaying brightness of the first displaying region block and the displaying brightness of the second displaying region block approach the target displaying brightness, wherein the target displaying brightness may be the displaying brightness corresponding to the testing grayscale value.

In the present alternative example, the method may comprise photographing the frame displayed by the display panel with a given testing grayscale value at a high resolution; according to the result of the photographing, by using the De-mura algorithm, determining the compensation coefficients corresponding to the sub-pixels; subsequently, according to the compensation coefficients, delimiting the display panel into a plurality of displaying region blocks of unequal displaying brightnesses, and, for the second displaying region block, whose compensation coefficient is negative, determining the corresponding target correction coefficient with one testing grayscale value; and, based on the target correction coefficient, determining the correction coefficient corresponding to the first displaying region block with the same one testing grayscale value.

Subsequently, the method may comprise assigning the correction coefficient corresponding to each of the displaying region blocks with the same one testing grayscale value to the sub-pixels within the displaying region block, and starting the compensation to the same one testing grayscale value inputted into the sub-pixels; subsequently photographing the displayed frame of the display panel after the compensation at a high resolution, to acquire the difference between the displaying brightnesses corresponding to the second displaying region block and the first displaying region block; and, subsequently, according to the difference, correcting the correction coefficient of the first displaying region block.

Subsequently, the correction coefficients corresponding to the displaying region blocks (the first displaying region block and the second displaying region block) with the unequal testing grayscale values may be stored into the corresponding preset tables.

In an alternative example, the step of, based on the difference between the first actual displaying brightness and the second actual displaying brightness, correcting the initial correction coefficient may comprise:

- if an absolute value of the difference is greater than a preset difference and characterizes that a brightness of the first displaying region block is less than a brightness of the second displaying region block, increasing the initial correction coefficient; and
- if the absolute value of the difference is greater than the preset difference and characterizes that the brightness of the first displaying region block is greater than the brightness of the second displaying region block, reducing the initial correction coefficient.

In the present example, if the absolute value of the difference is greater than the preset difference, that indicates that, after the grayscale compensation to the second displaying region block and the first displaying region block, the displaying brightnesses have a high difference. In such a case, if the brightness of the first displaying region block is less than the brightness of the second displaying region block, that indicates that the compensation magnitude of the darkening region has been corrected at a higher level; in other words, the initial correction parameters cause the brightnesses of the sub-pixels within the darkening region to be compensated for less. In such a case, it is required to increase the magnitude of the brightness compensation to the sub-pixels within the darkening region. Therefore, it is required to increase the initial correction coefficient, for example, increasing it from 0.95 to 0.98 or 1.

If the brightness of the first displaying region block is greater than the brightness of the second displaying region block, that indicates that the compensation magnitude of the darkening region has been corrected at a lower level; in other words, the initial correction parameters cause the brightnesses of the sub-pixels within the darkening region to be compensated for more, which causes that they have a high difference from the grayscales of the brightening region after the compensation. In such a case, it is required to reduce the magnitude of the brightness compensation to the sub-pixels within the darkening region. Therefore, it is required to reduce the initial correction coefficient, for example, reducing it from 0.95 to 0.94 or 0.93, provided that it is required to ensure that the initial correction coefficient that has been reduced is greater than the target correction coefficient.

In an example, the amplitude of the increasing of the initial correction coefficient and the amplitude of the reduction of the initial correction coefficient may be equal, and may be a preset amplitude, for example, preset to be 0.02 or 0.01.

Certainly, no matter whether the initial correction coefficient is increased or reduced, it is required to ensure that the displaying brightnesses corresponding to the first displaying region block and the second displaying region block with the testing grayscale value approach the target displaying brightness, i.e., approaching the displaying brightness corresponding to the testing grayscale value.

By using such an embodiment, the method may comprise, before the display panel leaves factory, inputting unequal testing grayscale values into the display panel, and determining the correction coefficients corresponding to the first displaying region block and the second displaying region block with the unequal testing grayscale values. Moreover, in the determination on the correction coefficient corresponding to the first displaying region block with the testing grayscale value, the method may comprise firstly determining the target correction coefficient corresponding to the second displaying region block with the testing grayscale value, and, subsequently, based on the target correction coefficient, determining the correction coefficient corresponding to the first displaying region block with the testing grayscale value, wherein the correction coefficient corresponding to the first displaying region block is required to ensure the uniformity between the actual displaying brightness of it after the compensation and the actual displaying brightness of the second displaying region block after the compensation. Accordingly, gradient correction on the compensation magnitudes of the different displaying region blocks by the compensation coefficients can be realized, which can increase the level of the uniformity of the displaying brightness of the display panel.

The process of the above-described grayscale compensating method will be described illustratively below with reference to two particular examples:

In a first example, before the display panel leaves factory, the compensation coefficients and the correction coefficients corresponding to the sub-pixels have been completely set:

When an OLED-panel production line has completed the production of a batch of OLED display panels, the quality inspection on the OLED display panels and the compensation to the displayed frames begin. The compensation to the displayed frames includes the compensation to the grayscales, i.e., compensating for the brightnesses of the displayed frames.

Firstly, the same one data voltage is inputted into each of the sub-pixels in the display panel, to control the plurality of sub-pixels in the display panel to emit light under the same one data voltage. As influenced by the electric characteristics of the sub-pixels and the encapsulating process, the displaying brightnesses of the sub-pixels in the display panel might be not uniform. In this case, the displayed frames may be photographed by using a high-resolution camera. It should be noted that, usually, the displayed frames of the display panel with unequal grayscales are collected by using the high-resolution camera, i.e., the displayed frames of the display panel when unequal data voltages are inputted.

Subsequently, according to the result of the photographing, based on a corresponding compensation algorithm, the brightness data obtained by the photographing are processed and operated, to generate the corresponding compensation data, so as to obtain the compensation coefficients of the sub-pixels.

Subsequently, high-resolution image collection is performed to the displayed frames obtained after the display panel has been compensated for according to the compensation coefficients with a low grayscale, and, according to the collected brightness data, it is determined whether the brightening region generates black block. If yes, it is required to determine the correction coefficients of the sub-pixels.

Subsequently, in the determination on the correction coefficients, according to the compensation coefficients of the sub-pixels, the display panel is delimited into the brightening region (the second displaying region block) and the darkening region (the first displaying region block), and a preset range of the testing grayscale value is acquired (for example, 0-32).

Subsequently, the target correction coefficient that satisfies the target condition with the testing grayscale value of the sub-pixel having the lowest compensation coefficient within the brightening region is determined. Assuming that the testing grayscale value is 8, and the compensation coefficient corresponding to the sub-pixel having the lowest compensation coefficient is −8, the target correction coefficient is required to be less than 1, and, if it is assumed to be 0.9, then all of the correction coefficients corresponding to all of the sub-pixels within the brightening region are 0.9.

Subsequently, the correction coefficient corresponding to the darkening region is determined to be a value greater than 0.9, and, if it is assumed to be 0.95, then all of the correction coefficients corresponding to all of the sub-pixels within the darkening region are 0.95.

Subsequently, it is started to collect the displayed frame of the display panel after the brightness compensation to the sub-pixels with the inputted testing grayscale value according to the correction coefficients corresponding to the displaying region blocks and the compensation coefficients corresponding to the sub-pixels.

Subsequently, according to the grayscale values of the pixel points in the collected frame, the difference between the displaying brightness of the brightening region and the displaying brightness of the darkening region is detected. If the difference is not high, then the compensation may be performed according to the determined correction coefficients. If the difference is high, then, while ensuring that the correction coefficient of the brightening region is not changed, the correction coefficient of the darkening region is adjusted, whereby, in the displayed frame that has been compensated for with the testing grayscale value according to the compensation coefficients and the correction coefficients, the displaying brightnesses of the brightening region and the darkening region have a low difference therebetween.

By using unequal testing grayscale values, the above process of determining the correction coefficients is repeated, to obtain the correction coefficients corresponding to the brightening region and the darkening region with the unequal testing grayscale values.

Finally, the correction coefficients corresponding to the brightening region and the darkening region with the unequal testing grayscale values are stored into corresponding preset tables, wherein the preset tables may be read by the driving chip of the display panel.

After the delivery of the display panel, in the process of the user using the display panel for frame displaying, when a frame comes, according to the to-be-displayed frame, the to-be-displayed grayscale values corresponding to the sub-pixels may be determined. If the to-be-displayed grayscale values are in the low-grayscale range (0-32), from the driving chip are read the compensation coefficients corresponding to the sub-pixels, and the correction coefficients corresponding to the displaying region blocks where the sub-pixels are located with the to-be-displayed grayscale values. Based on the compensation coefficients and the correction coefficients, according to the formula (2), the to-be-displayed grayscale values of the sub-pixels are compensated for, to obtain the post-compensation grayscale values. According to the post-compensation grayscale values, the sub-pixels are driven to emit light.

If the to-be-displayed grayscale values are in the low-grayscale range (0-32), the compensation coefficients corresponding to the sub-pixels are read from the driving chip. According to the formula (1), the to-be-displayed grayscale values of the sub-pixels are compensated for, to obtain the post-compensation grayscale values. According to the post-compensation grayscale values, the sub-pixels are driven to emit light.

Figure 5:
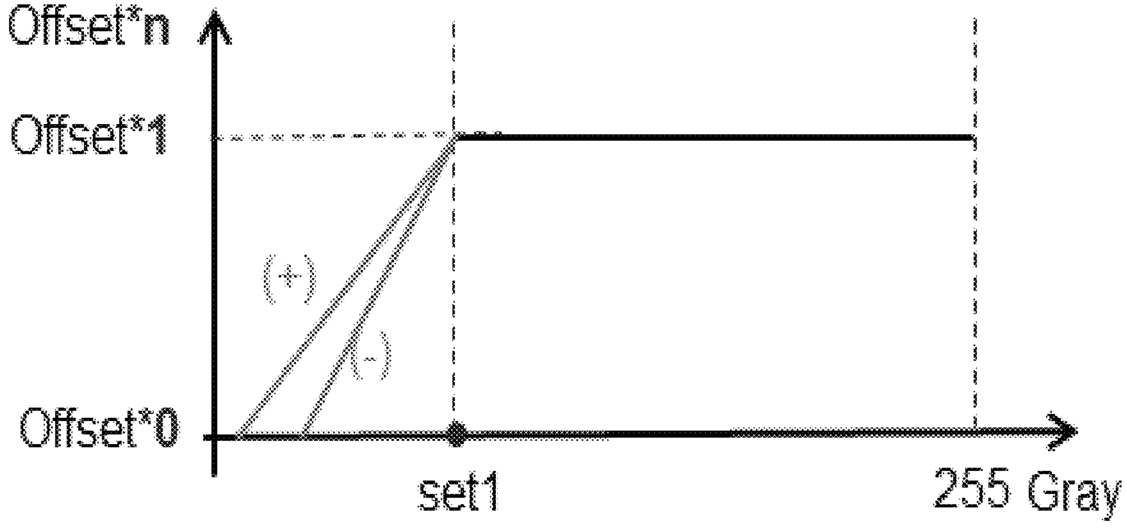
FIG. 5 shows a curve diagram of the correction coefficients corresponding to two types of the compensation coefficients according to the first example in the embodiments of the present disclosure.

Referring to FIG. 5, FIG. 5 shows a curve diagram of the correction coefficients corresponding to two types of the compensation coefficients according to the first example. In FIG. 5, offset represents the compensation coefficient, the axis of offset*0-offset*n represents the correction coefficient, and Gray represents the grayscale value. It can be seen that, with the same one inputted grayscale in the low-grayscale range, the displaying region block whose compensation coefficients are greater than 0 has a higher correction coefficient, and the displaying region block whose compensation coefficients are less than 0 has a lower correction coefficient. Furthermore, unequal grayscale values correspond to unequal correction coefficients. Accordingly, the brightening region and the darkening region employ two different paths of the grayscale compensation. It can also be seen from the slopes of the two lines in FIG. 7 that the compensation paths are different.

Figure 6:
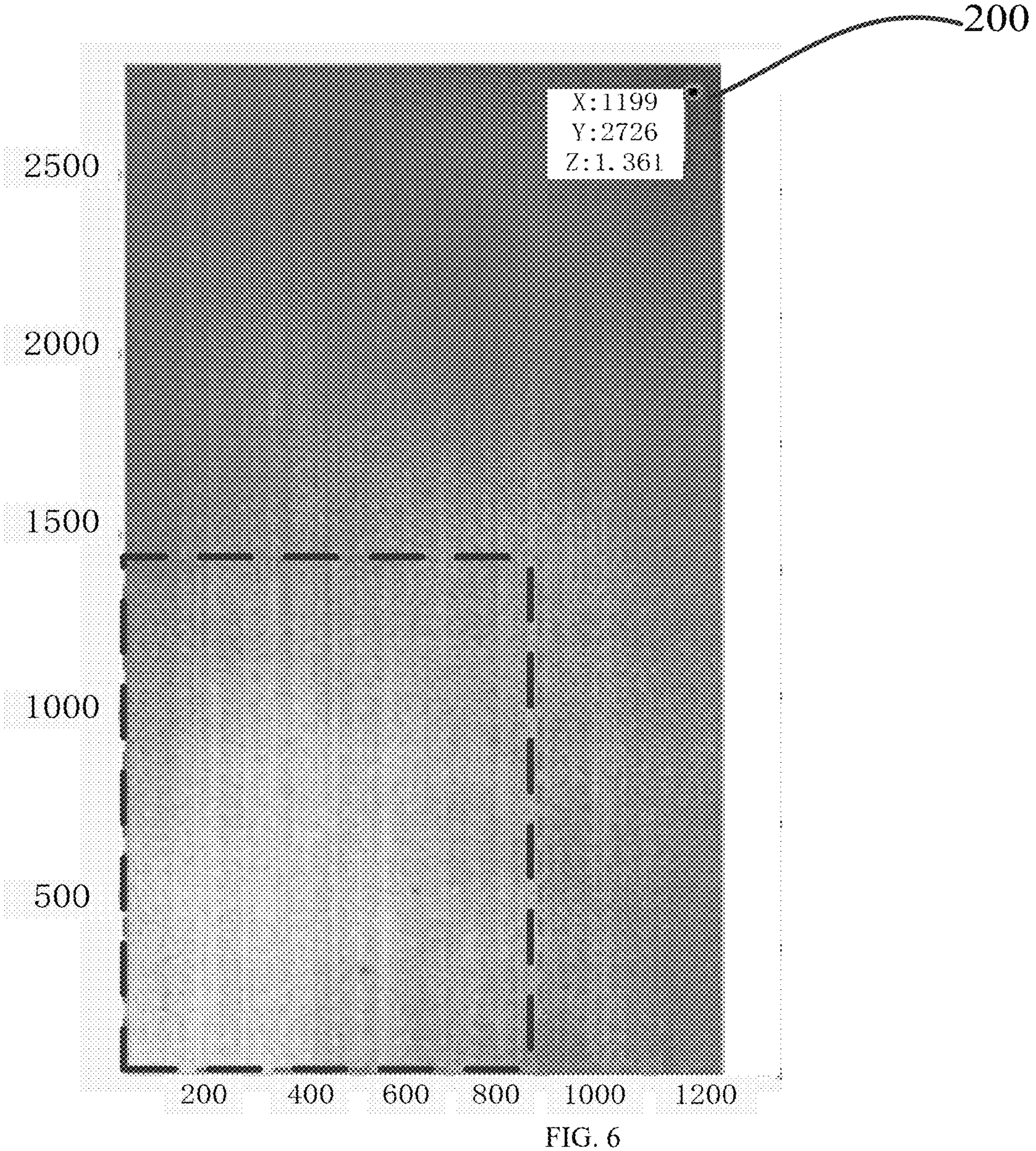
FIG. 6 shows a schematic diagram of the frame obtained after the displayed frame shown in FIG. 1 has been compensated for by using the grayscale compensating method according to an embodiment of the present disclosure.

Referring to FIG. 6, FIG. 6 shows a schematic diagram of the frame obtained after the displayed frame shown in FIG. 1 has been compensated for by using the grayscale compensating method according to the present disclosure. As compared with FIG. 1, the black block 200 of the brightening region in the displayed frame shown in FIG. 6 has been repaired, and the brightness compensation to the darkening region is not affected. It should be noted that the black dot at the top right corner in FIG. 6 merely marks the coordinate position where the black block appeared, and does not represent that, after the compensation, at that position black block exists.

In a second example, before the display panel leaves factory, the compensation coefficients corresponding to the sub-pixels have been completely set, and, after the factory leaving, according to the to-be-displayed frame, the grayscales of the sub-pixels are compensated for dynamically:

When an OLED-panel production line has completed the production of a batch of OLED display panels, the quality inspection on the OLED display panels and the compensation to the displayed frames begin. The compensation to the displayed frames includes the compensation to the grayscales, i.e., compensating for the brightnesses of the displayed frames.

Firstly, the same one data voltage is inputted into each of the sub-pixels in the display panel, to control the plurality of sub-pixels in the display panel to emit light under the same one data voltage. As influenced by the electric characteristics of the sub-pixels and the encapsulating process, the displaying brightnesses of the sub-pixels in the display panel might be not uniform. In this case, the displayed frames may be photographed by using a high-resolution camera. It should be noted that, usually, the displayed frames of the display panel with unequal grayscales are collected by using the high-resolution camera, i.e., the displayed frames of the display panel when unequal data voltages are inputted.

Subsequently, according to the result of the photographing, based on a corresponding compensation algorithm, the brightness data obtained by the photographing are processed and operated, to generate the corresponding compensation data, so as to obtain the compensation coefficients of the sub-pixels.

Subsequently, the compensation coefficients are burnt into the driving chip of the display panel.

After the delivery of the display panel, in the process of the user using the display panel for frame displaying, when a frame comes, according to the to-be-displayed frame, the to-be-displayed grayscale values corresponding to the sub-pixels may be determined. If the to-be-displayed grayscale values are in the low-grayscale range (0-32), the compensation coefficients corresponding to the sub-pixels are read from the driving chip. According to the compensation coefficients and the to-be-displayed grayscale values corresponding to the sub-pixels, by using the target condition as the constraint (the grayscale values after the compensation are not 0), the correction coefficients corresponding to the sub-pixels are obtained. Regarding the sub-pixels whose compensation coefficients are greater than 0, the correction coefficient may be set to be a value maintaining the compensation magnitude, for example, 1.

Subsequently, based on the compensation coefficients and the correction coefficients, according to the formula (2), the to-be-displayed grayscale values of the sub-pixels are compensated for, to obtain the post-compensation grayscale values. According to the post-compensation grayscale values, the sub-pixels are driven to emit light.

Certainly, if the to-be-displayed grayscale values are in the medium-high-grayscale range, then the to-be-displayed grayscale values of the sub-pixels may be compensated for directly according to the compensation coefficients, to obtain the post-compensation grayscale values. According to the post-compensation grayscale values, the sub-pixels are driven to emit light.

By using the above-described grayscale compensating method, because the positive and negative compensation paths are employed, or, in other words, the correction coefficient of the darkening region and the correction coefficient of the brightening region are unequal, wherein the correction coefficient of the darkening region is greater than the correction coefficient of the brightening region, the brightening region and the darkening region have different compensation paths the low grayscales, and the compensation to the brightening region does not affect the compensation to the darkening region, whereby they do not restrict each other, thereby increasing the brightness uniformity of the displayed frame.

Furthermore, because the correction coefficients can be determined according to the compensation coefficients, so as to trim the compensation magnitudes, it can be not required to, as in the related art, entirely reduce the range of the compensation coefficients, which affects the frame uniformity of medium and high grayscales.

On the basis of the same inventive concept, the present disclosure further provides a displaying driving method. The displaying driving method can, when driving the display panel for frame displaying, based on the compensation coefficients and the correction coefficients that are determined by using the above-described grayscale compensating method, perform grayscale compensation to the displayed frame.

Figure 7:
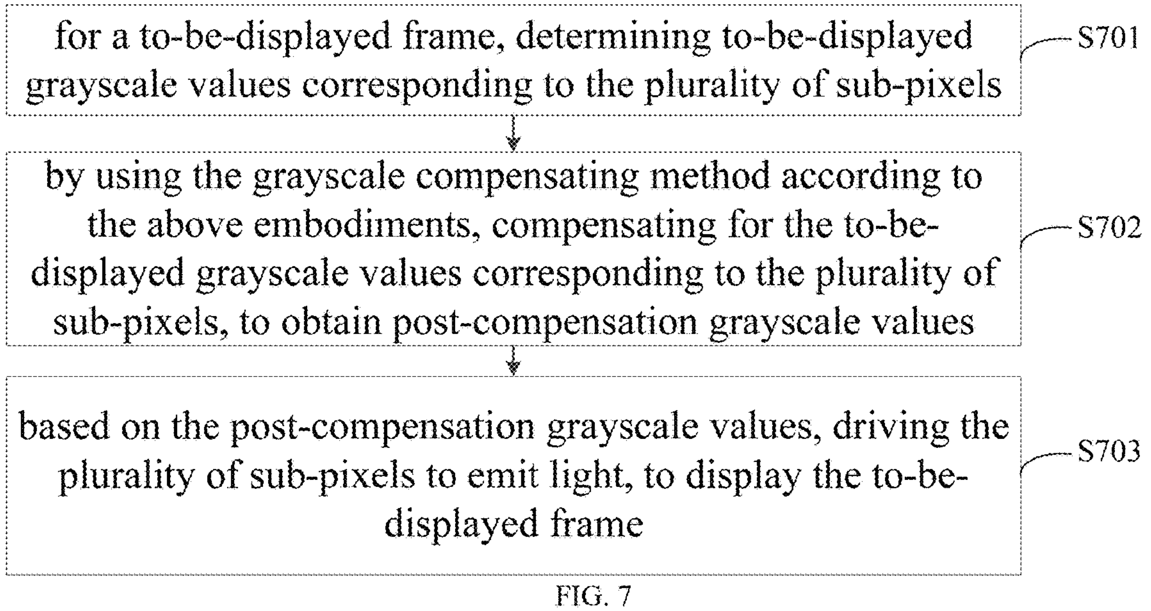
FIG. 7 shows a schematic flow chart of the steps of a displaying driving method according to an embodiment of the present disclosure.

Referring to FIG. 7, FIG. 7 shows a schematic flow chart of the steps of the displaying driving method. As shown in FIG. 7, the method is applied in a display panel, the display panel comprises a plurality of sub-pixels, and the method may particularly comprise the following steps:

Step S701: for a to-be-displayed frame, determining to-be-displayed grayscale values corresponding to the plurality of sub-pixels.

The approach of determining the to-be-displayed grayscale values may refer to the description in the related art. For example, the to-be-displayed grayscale values corresponding to the sub-pixels may be determined according to the grayscale values of the pixel points in the displayed frame.

Step S702: by using the grayscale compensating method according to the above embodiments, compensating for the to-be-displayed grayscale values corresponding to the plurality of sub-pixels, to obtain post-compensation grayscale values.

In the present embodiment, the method may comprise firstly, by using the above-described grayscale compensating method, determining the correction coefficients and the compensation coefficients corresponding to the sub-pixels, and, subsequently, according to the formula (2), compensating for the to-be-displayed grayscale values corresponding to the plurality of sub-pixels, to obtain the post-compensation grayscale values.

Step S703: based on the post-compensation grayscale values, driving the plurality of sub-pixels to emit light, to display the to-be-displayed frame.

In the present embodiment, the method may comprise, according to the post-compensation grayscale values corresponding to the plurality of sub-pixels, determining data voltages corresponding to the plurality of sub-pixels, and, subsequently, providing the corresponding data voltages to the sub-pixels. The sub-pixels emit light by the driving by the data voltages, thereby displaying the to-be-displayed frame.

The electric circuits that drive the sub-pixels to emit light may be 7T1C circuits, or may be 4T1C circuits, which is not particularly limited in the present disclosure.

It should be noted that, in the determination on the correction coefficients corresponding to the sub-pixels, in a mode, they may be dynamically determined according to the to-be-displayed grayscale values and the compensation coefficients corresponding to each frame of the to-be-displayed frames. Accordingly, the brightness of each frame of the to-be-displayed frames of the displaying device can be dynamically uniformed. In another mode, the pre-stored correction coefficients may be read from a storage medium of the displaying device. In the reading, according to the displaying region blocks where the sub-pixels are located, the correction coefficients corresponding to the displaying region blocks may be read from the storage medium, and therefore the correction coefficients may be directly read, which can increase the response efficiency of the displayed frame.

By using the technical solution of the present embodiment, the compensation of different gradients for the brightnesses of the sub-pixels can be realized in the two dimensions of the compensation coefficients and the correction coefficients, and, in the different compensation modes, the unequal to-be-displayed grayscale values can have unequal correction coefficients, so as to correspondingly trim the compensation magnitudes in the different compensation modes. As a result, in the compensation to the sub-pixels, not only the compensation is performed according to the encapsulation of the sub-pixels (the compensation coefficients), but also the compensation magnitudes are trimmed according to the compensation modes and the responses by the to-be-displayed grayscale values to the compensation (if the compensation coefficient is higher and the to-be-displayed grayscale value is lower, the response is higher), whereby the compensation is more precise. Accordingly, the actual displaying brightnesses of the sub-pixels after the compensation can be close to each other, thereby preventing the problem of nonuniform displaying brightness of the entire panel, which improves the quality of displaying of the displayed frame.

In an alternative example of the present embodiment, the step of, based on the post-compensation grayscale values, driving the plurality of sub-pixels to emit light may comprise:

- based on the post-compensation grayscale values corresponding to the plurality of sub-pixels, determining data voltages corresponding to the plurality of sub-pixels;
- acquiring compensation voltages corresponding to the plurality of sub-pixels;
- compensating for the data voltages based on the compensation voltages, to obtain post-compensation voltages corresponding to the plurality of sub-pixels; and
- subsequently, based on the post-compensation voltages corresponding to the plurality of sub-pixels, driving the plurality of sub-pixels to emit light.

The compensation to the to-be-displayed grayscale values of the sub-pixels may be understood as the brightness compensation to the displayed frame, which is mainly used to compensate for the problem of nonuniform displaying brightness caused by the encapsulating process. For example, in the encapsulating process, the panel leads have high lengths and high resistances, and therefore the power-supply voltage generates a voltage drop (IR Drop) across the leads, which affects the inputting of the data voltages.

In practice, the sub-pixels are driven by the driving circuits to emit light, and, in the fabrication of the driving circuits of the display panel, as influenced by the process, inevitably the driving circuits of the different sub-pixels have different electric characteristics. Therefore, if the data voltages that are to be inputted into the sub-pixels are calculated according to the post-compensation grayscale values, because of the difference in the driving circuits of the sub-pixels, the data voltages inputted into the sub-pixels might be insufficient or excessively high, which subsequently affects the displaying brightnesses. Accordingly, the electric characteristics of the driving circuits of the sub-pixels may be sensed, to obtain the compensation voltages characterizing the electric characteristics of the driving circuits.

Particularly, the process of sensing the electric characteristics of the driving circuits of the sub-pixels may comprise, by using the driving chip, measuring the sensitive data corresponding to the electric characteristics (the threshold voltage and the electron mobility of the driving TFT and the threshold voltage of the OLED) of the pixels, and, based on the sensitive data, obtaining the compensation voltages corresponding to the sub-pixels, so as to compensate for the deviation between the electric characteristics of the pixels.

In practice, the compensation voltages corresponding to the plurality of sub-pixels may be pre-stored into the driving chip. In the pixel driving, the compensation voltages corresponding to the sub-pixels may be acquired directly from the driving chip.

After the compensation voltages have been obtained, the data voltages of the sub-pixels may be compensated for, wherein the process of the compensation may refer to the related art. After the post-compensation voltages have been obtained, the driving chip may input the corresponding post-compensation voltages into the driving circuits of the sub-pixels. The post-compensation voltages serve as the data voltages of the driving circuits, whereby, by the effect of the driving circuits, the data voltages drive the sub-pixels to emit light. That cannot only prevent the problem of a low brightness uniformity of the displayed frame caused by the encapsulating process, but also can prevent the problem of a low brightness uniformity of the displayed frame caused by the difference in the electric characteristics of the sub-pixels.

On the basis of the same inventive concept, the present disclosure further provides a driving chip. The driving chip may be applied in a display panel, and be configured for implementing the grayscale compensating method of the display panel, or configured for implementing the displaying driving method of the display panel.

On the basis of the same inventive concept, the present disclosure further provides a displaying device, wherein the displaying device comprises a display panel, the display panel comprises a displaying region, a plurality of sub-pixels are provided within the displaying region, and the displaying device stores compensation coefficients and correction coefficients corresponding to the plurality of sub-pixels. The compensation coefficients are for characterizing the compensation modes and the compensation magnitudes of brightness compensations to the sub-pixels, wherein the compensation modes include the mode of increasing the brightness and the mode of reducing the brightness. The correction coefficients are determined based on the compensation coefficients and to-be-displayed grayscale values, the unequal to-be-displayed grayscale values correspond to unequal correction coefficients, and the correction coefficients are for correcting the compensation magnitudes.

If the displaying device is operating in a preset grayscale range, after the to-be-displayed grayscale values of the plurality of sub-pixels have been corrected by using the compensation coefficients and the correction coefficients, in the displaying device no black-block region whose displaying brightness is 0 exists, and with the same one to-be-displayed grayscale value, the displaying brightnesses of the plurality of sub-pixels approach the displaying brightness corresponding to the to-be-displayed grayscale value. The preset grayscale range may be any one grayscale section of the grayscales of 0-32.

The display panel may drive the displaying by using the above-described displaying driving method, to cause the display panel to display the frames.

The compensation coefficients and the correction coefficients stored in the displaying device may be determined by using the process of the first example in the above embodiments of the grayscale compensating method, and are burnt into the driving chip of the displaying device.

Figure 8:
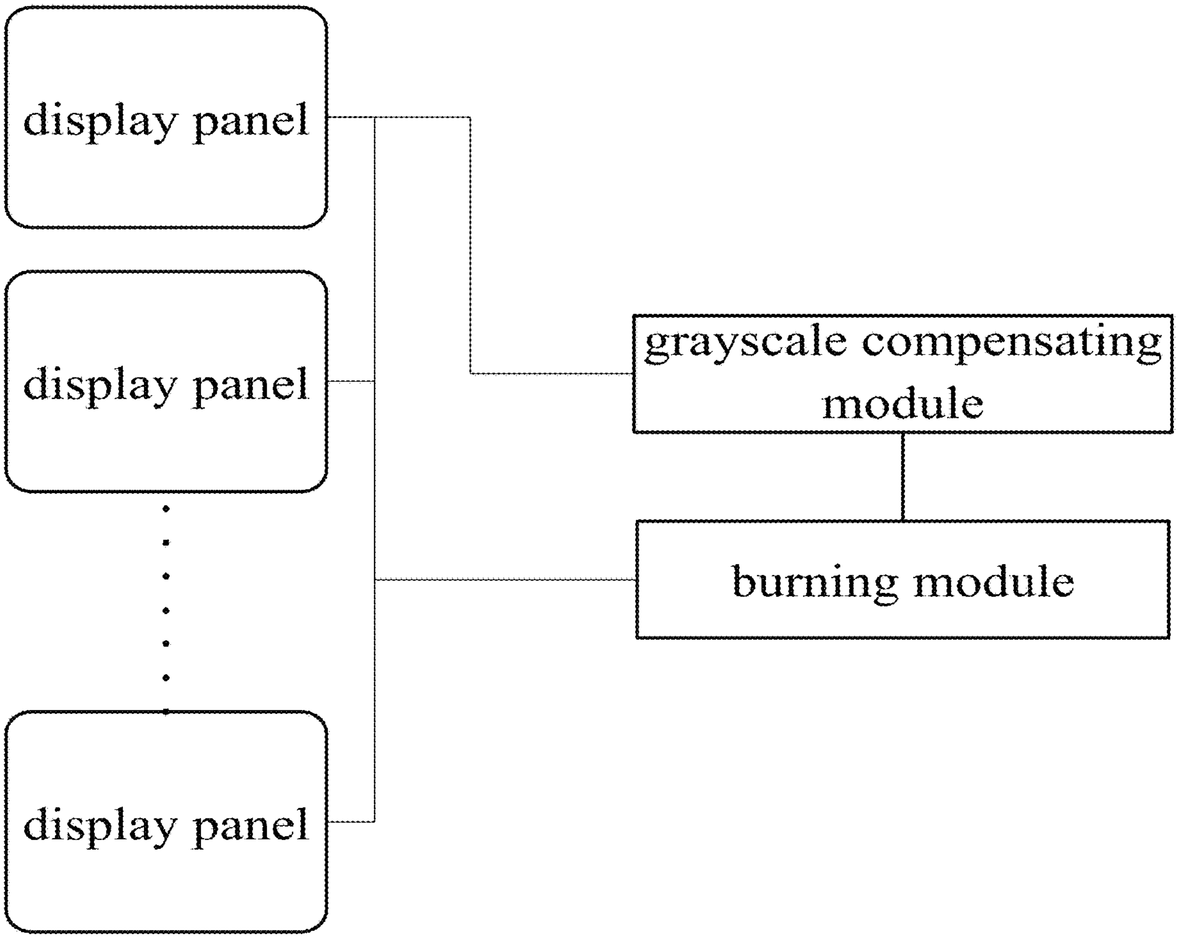
FIG. 8 shows a schematic structural diagram of the architecture of a displaying system according to an embodiment of the present disclosure.

On the basis of the same inventive concept, the present disclosure further provides a displaying system. Referring to FIG. 8, FIG. 8 shows a schematic structural diagram of the architecture of the displaying system. As shown in FIG. 8, the displaying system comprises a grayscale compensating module and a burning module;

the grayscale compensating module is configured for determining displaying parameters corresponding to a first display panel, wherein the displaying parameters include compensation coefficients and correction coefficients corresponding to the sub-pixels, wherein the correction coefficients are determined by using the grayscale compensating method;

the burning module is configured for burning the displaying parameters outputted by the grayscale compensating module into the first display panel and a plurality of second display panels; and the second display panels and the first display panel are fabricated in a same one process flow.

By using such an embodiment, regarding a plurality of display panels that are fabricated in bulk in the same one process flow, it can be merely required to determine the compensation coefficients and the correction coefficients of the sub-pixels in the first display panel, which can be applied in the second display panels of this batch. That is because, in the same one process flow, the plurality of display panels are in the same one manufacture procedure, and the encapsulating processes and the process parameters are the same. Therefore, the characteristics of the sub-pixels of the plurality of display panels with respect to the grayscale displaying are equal to or similar. Therefore, after the compensation coefficients and the correction coefficients with the unequal to-be-displayed grayscale values of the sub-pixels in one of the display panels have been determined, they can be universally used in the other display panels.

Figure 9:
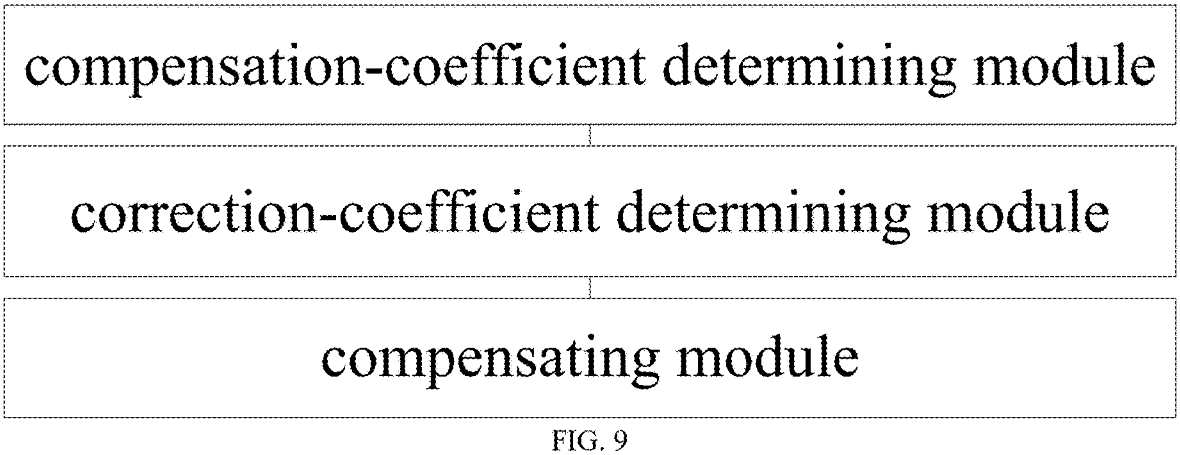
FIG. 9 shows a schematic structural diagram of a grayscale compensating apparatus according to an embodiment of the present disclosure.

On the basis of the same inventive concept, the present disclosure further provides a grayscale compensating apparatus. Referring to FIG. 9, FIG. 9 shows a schematic structural diagram of the apparatus. As shown in FIG. 9, the apparatus particularly comprises the following modules:

a compensation-coefficient determining module configured for determining compensation coefficients corresponding to a plurality of sub-pixels in a display panel, wherein the compensation coefficients are for characterizing compensation modes and compensation magnitudes of brightness compensations to the sub-pixels, wherein the compensation modes include a mode of increasing a brightness and a mode of reducing a brightness;

a correction-coefficient determining module configured for, based on to-be-displayed grayscale values corresponding to the sub-pixels and the compensation coefficients, determining correction coefficients corresponding to the sub-pixels, wherein unequal instances of the to-be-displayed grayscale values correspond to unequal instances of the correction coefficients, and the correction coefficients are for correcting the compensation magnitudes; and a compensating module configured for, based on the compensation coefficients and the correction coefficients, compensating for the to-be-displayed grayscale values of the plurality of sub-pixels, to reduce a difference in emitted-light brightnesses of the plurality of sub-pixels.

Optionally, the correction-coefficient determining module is particularly configured for:

if the compensation coefficients are less than 0, based on the compensation coefficients and the to-be-displayed grayscale values, by using a target condition as a constraint, determining the correction coefficients; and if the compensation coefficients are greater than 0, determining the correction coefficients to be a preset value for maintaining the compensation magnitudes;

wherein the target condition is that post-compensation grayscale values of the sub-pixels are not 0.

Optionally, the apparatus further comprises:

a delimiting module configured for, based on the compensation coefficients corresponding to the plurality of sub-pixels, delimiting the display panel into a first displaying region block and a second displaying region block, wherein the compensation coefficients in the first displaying region block are greater than 0, and the compensation coefficients in the second displaying region block are less than 0;

wherein the correction coefficients corresponding to the sub-pixels within the first displaying region block are the preset value for maintaining the compensation magnitudes; and the correction coefficients corresponding to the sub-pixels within the second displaying region block are the correction coefficients that are determined based on the compensation coefficients and the to-be-displayed grayscale values by using the target condition as the constraint.

Optionally, the display panel comprises a first displaying region block and a second displaying region block, the compensation coefficients corresponding to the sub-pixels within the first displaying region block are greater than 0, and the compensation coefficients corresponding to the sub-pixels within the second displaying region block are less than 0. The determining unit is particularly configured for, for the sub-pixels within the first displaying region block, determining preset correction coefficients corresponding to the to-be-displayed grayscale values in a first preset table to be first correction coefficients corresponding to the sub-pixels within the first displaying region block; and for the sub-pixels within the second displaying region block, determining preset correction coefficients corresponding to the to-be-displayed grayscale values in a second preset table to be second correction coefficients corresponding to the sub-pixels within the second displaying region block.

Optionally, the first correction coefficients are greater than the second correction coefficients.

Optionally, the apparatus further comprises:

an acquiring unit configured for acquiring a testing grayscale value corresponding to the display panel; and a correction-coefficient determining unit configured for, by using a target condition as a constraint, based on the testing grayscale value and an coefficient range of the compensation coefficients of the sub-pixels within the displaying region blocks, determining correction coefficients corresponding to the displaying region blocks with the testing grayscale value;

wherein the target condition is that, if the to-be-displayed grayscale values are the testing grayscale value, within the displaying region blocks no sub-pixel exists the post-compensation grayscale value of which is 0.

Optionally, the correction-coefficient determining unit is particularly configured for executing the following steps:

determining a target sub-pixel having a lowest instance of the compensation coefficients from the second displaying region block;

based on the compensation coefficient corresponding to the target sub-pixel and the testing grayscale value, determining a target correction coefficient corresponding to the target sub-pixel when the target condition is satisfied;

determining the target correction coefficient to be a correction coefficient corresponding to the second displaying region block with the testing grayscale value; and based on the target correction coefficient, determining a correction coefficient corresponding to the first displaying region block with the testing grayscale value.

Optionally, the step of, based on the target correction coefficient, determining the correction coefficient corresponding to the first displaying region block with the testing grayscale value comprises:

according to the target correction coefficient, determining an initial correction coefficient corresponding to the first displaying region block with the testing grayscale value;

based on the target correction coefficient and the compensation coefficients corresponding to the sub-pixels within the second displaying region block, compensating for the testing grayscale value, to obtain a first preestimated grayscale value corresponding to the sub-pixels within the second displaying region block;

based on the initial correction coefficient and the compensation coefficients corresponding to the sub-pixels within the first displaying region block, compensating for the testing grayscale value, to obtain a second preestimated grayscale value corresponding to the sub-pixels within the first displaying region block;

acquiring a first actual displaying brightness corresponding to the second displaying region block with the first preestimated grayscale value;

acquiring a second actual displaying brightness corresponding to the first displaying region block with the second preestimated grayscale value; and based on a difference between the first actual displaying brightness and the second actual displaying brightness, updating the initial correction coefficient, to cause a displaying brightness of the first displaying region block and a displaying brightness of the second displaying region block to approach a target displaying brightness.

Optionally, the step of, based on the difference between the first actual displaying brightness and the second actual displaying brightness, correcting the initial correction coefficient comprises:

if an absolute value of the difference is greater than a preset difference and characterizes that a brightness of the first displaying region block is less than a brightness of the second displaying region block, increasing the initial correction coefficient; and if the absolute value of the difference is greater than the preset difference and characterizes that the brightness of the first displaying region block is greater than the brightness of the second displaying region block, reducing the initial correction coefficient.

Optionally, with the same one to-be-displayed grayscale value, the correction coefficients corresponding to the sub-pixels the compensation coefficients of which are greater than 0 are unequal to the correction coefficients corresponding to the sub-pixels the compensation coefficients of which are less than 0.

Figure 10:
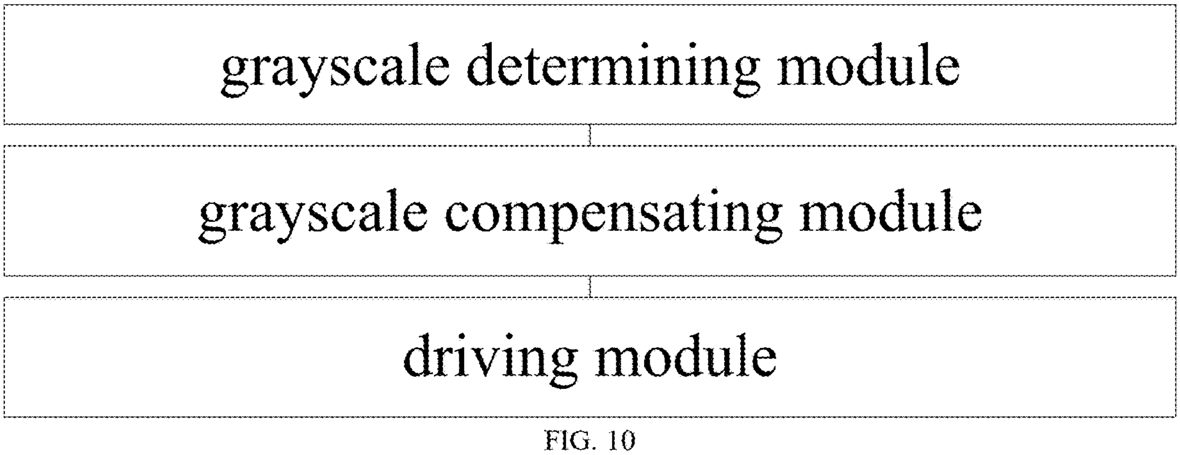
FIG. 10 shows a schematic structural diagram of a displaying driving apparatus according to an embodiment of the present disclosure.

On the basis of the same inventive concept, the present disclosure further provides a displaying driving apparatus. Referring to FIG. 10, FIG. 10 shows a schematic structural diagram of the apparatus. As shown in FIG. 10, the apparatus may particularly comprise the following modules:

a grayscale determining module configured for, for a to-be-displayed frame, determining to-be-displayed grayscale values corresponding to the plurality of sub-pixels;

a grayscale compensating module configured for, by using the grayscale compensating method, compensating for the to-be-displayed grayscale values corresponding to the plurality of sub-pixels, to obtain post-compensation grayscale values; and a driving module configured for, based on the post-compensation grayscale values, driving the plurality of sub-pixels to emit light, to display the to-be-displayed frame.

Optionally, the driving module comprises:

a data-voltage determining unit configured for, based on the post-compensation grayscale values corresponding to the plurality of sub-pixels, determining data voltages corresponding to the plurality of sub-pixels;

a compensation-voltage acquiring unit configured for acquiring compensation voltages corresponding to the plurality of sub-pixels;

a voltage compensating unit configured for compensating for the data voltages based on the compensation voltages, to obtain post-compensation voltages corresponding to the plurality of sub-pixels; and a driving unit configured for, based on the post-compensation voltages corresponding to the plurality of sub-pixels, driving the plurality of sub-pixels to emit light.

On the basis of the same inventive concept, the present disclosure further provides a computer-readable storage medium, wherein a computer program stored therein, when executed by a processor, implements the grayscale compensating method of the display panel, or the displaying driving method.

On the basis of the same inventive concept, the present disclosure further provides an electronic device, wherein the electronic device comprises a memory and a processor, and a computer program stored in the memory, when executed by the processor, implements the grayscale compensating method of the display panel, or the displaying driving method.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms “include”, “comprise” or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording “comprising a . . . ” does not exclude additional same element in the process, method, article or device comprising the element.

The grayscale compensating method, the displaying driving method, the apparatus, the system, the chip and the medium according to the present disclosure have been described in detail above. The principle and the embodiments of the present disclosure are described herein with reference to the particular examples, and the description of the above embodiments is merely intended to facilitate to comprehend the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

A person skilled in the art, after considering the description and implementing the invention disclosed herein, will readily envisage other embodiments of the present disclosure. The present disclosure aims at encompassing any variations, uses or adaptative alternations of the present disclosure, wherein those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the following claims.

It should be understood that the present disclosure is not limited to the accurate structure that has been described above and shown in the drawings, and may have various modifications and variations without departing from its scope. The scope of the present disclosure is merely limited by the appended claims.

The “one embodiment”, “an embodiment” or “one or more embodiments” as used herein means that particular features, structures or characteristics described with reference to an embodiment are included in at least one embodiment of the present disclosure. Moreover, it should be noted that here an example using the wording “in an embodiment” does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word “comprise” does not exclude elements or steps that are not listed in the claims. The word “a” or “an” preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A grayscale compensating method, wherein the method comprises:

determining compensation coefficients corresponding to a plurality of sub-pixels in a display panel, wherein the compensation coefficients are for characterizing compensation modes and compensation magnitudes of brightness compensations to the sub-pixels, wherein the compensation modes include a mode of increasing a brightness and a mode of reducing a brightness;

based on to-be-displayed grayscale values corresponding to the sub-pixels and the compensation coefficients, determining correction coefficients corresponding to the sub-pixels, wherein unequal instances of the to-be-displayed grayscale values correspond to unequal instances of the correction coefficients, and the correction coefficients are for correcting the compensation magnitudes; and based on the compensation coefficients and the correction coefficients, compensating for the to-be-displayed grayscale values of the plurality of sub-pixels, to reduce a difference in emitted-light brightnesses of the plurality of sub-pixels, wherein based on the compensation coefficients corresponding to the plurality of sub-pixels, delimiting the display panel into a first displaying region block and a second displaying region block, wherein the compensation coefficients in the first displaying region block are greater than 0, and the compensation coefficients in the second displaying region block are less than 0;

wherein the correction coefficients corresponding to the sub-pixels within the first displaying region block are the preset value for maintaining the compensation magnitudes; and the correction coefficients corresponding to the sub-pixels within the second displaying region block are the correction coefficients that are determined based on the compensation coefficients and the to-be-displayed grayscale values by using a target condition as the constraint.

2. The grayscale compensating method according to claim 1, wherein the step of, based on the to-be-displayed grayscale values corresponding to the sub-pixels and the compensation coefficients, determining the correction coefficients corresponding to the sub-pixels comprises: for the sub-pixels the compensation coefficients of which are less than 0, based on the compensation coefficients and the to-be-displayed grayscale values, by using the target condition as the constraint, determining the correction coefficients; and for the sub-pixels the compensation coefficients of which are greater than 0, determining the correction coefficients to be the preset value for maintaining the compensation magnitudes; wherein the target condition is that post-compensation grayscale values of the sub-pixels are not 0.

3. The grayscale compensating method according to claim 1, wherein the display panel comprises a first displaying region block and a second displaying region block, the compensation coefficients corresponding to the sub-pixels within the first displaying region block are greater than 0, and the compensation coefficients corresponding to the sub-pixels within the second displaying region block are less than 0; and the step of, based on the to-be-displayed grayscale values corresponding to the sub-pixels and the compensation coefficients, determining the correction coefficients corresponding to the sub-pixels comprises:

for the sub-pixels within the first displaying region block, determining preset correction coefficients corresponding to the to-be-displayed grayscale values in a first preset table to be first correction coefficients corresponding to the sub-pixels within the first displaying region block; and for the sub-pixels within the second displaying region block, determining preset correction coefficients corresponding to the to-be-displayed grayscale values in a second preset table to be second correction coefficients corresponding to the sub-pixels within the second displaying region block.

4. The grayscale compensating method according to claim 3, wherein the first correction coefficients are greater than the second correction coefficients.

5. The grayscale compensating method according to claim 3, wherein the preset correction coefficients are acquired by using the following steps: acquiring a testing grayscale value corresponding to the display panel; and by using the target condition as the constraint, based on the testing grayscale value and an coefficient range of the compensation coefficients of the sub-pixels within the displaying region blocks, determining correction coefficients corresponding to the displaying region blocks with the testing grayscale value; wherein the target condition is that, if the to-be-displayed grayscale values are the testing grayscale value, within the displaying region blocks no sub-pixel exists the post-compensation grayscale value of which is 0.

6. The grayscale compensating method according to claim 5, wherein the step of, by using the target condition as the constraint, based on the testing grayscale value and the coefficient range of the compensation coefficients of the sub-pixels within the displaying region blocks, determining the correction coefficients corresponding to the displaying region blocks with the testing grayscale value comprises:

determining a target sub-pixel having a lowest instance of the compensation coefficients from the second displaying region block;

based on the compensation coefficient corresponding to the target sub-pixel and the testing grayscale value, determining a target correction coefficient corresponding to the target sub-pixel when the target condition is satisfied;

determining the target correction coefficient to be a correction coefficient corresponding to the second displaying region block with the testing grayscale value; and based on the target correction coefficient, determining a correction coefficient corresponding to the first displaying region block with the testing grayscale value.

7. The grayscale compensating method according to claim 6, wherein the step of, based on the target correction coefficient, determining the correction coefficient corresponding to the first displaying region block with the testing grayscale value comprises:

according to the target correction coefficient, determining an initial correction coefficient corresponding to the first displaying region block with the testing grayscale value;

based on the target correction coefficient and the compensation coefficients corresponding to the sub-pixels within the second displaying region block, compensating for the testing grayscale value, to obtain a first preestimated grayscale value corresponding to the sub-pixels within the second displaying region block;

based on the initial correction coefficient and the compensation coefficients corresponding to the sub-pixels within the first displaying region block, compensating for the testing grayscale value, to obtain a second preestimated grayscale value corresponding to the sub-pixels within the first displaying region block;

acquiring a first actual displaying brightness corresponding to the second displaying region block with the first preestimated grayscale value;

acquiring a second actual displaying brightness corresponding to the first displaying region block with the second preestimated grayscale value; and based on a difference between the first actual displaying brightness and the second actual displaying brightness, updating the initial correction coefficient, to cause a displaying brightness of the first displaying region block and a displaying brightness of the second displaying region block to approach a target displaying brightness.

8. The grayscale compensating method according to claim 7, wherein the step of, based on the difference between the first actual displaying brightness and the second actual displaying brightness, updating the initial correction coefficient comprises:

if an absolute value of the difference is greater than a preset difference and characterizes that a brightness of the first displaying region block is less than a brightness of the second displaying region block, increasing the initial correction coefficient; and if the absolute value of the difference is greater than the preset difference and characterizes that the brightness of the first displaying region block is greater than the brightness of the second displaying region block, reducing the initial correction coefficient.

9. The grayscale compensating method according to claim 6, wherein the correction coefficient corresponding to the second displaying region block with the testing grayscale value is shared by the plurality of sub-pixels within the second displaying region block.

10. The grayscale compensating method according to claim 1, wherein with a same one instance of the to-be-displayed grayscale values, the correction coefficients corresponding to the sub-pixels the compensation coefficients of which are greater than 0 are unequal to the correction coefficients corresponding to the sub-pixels the compensation coefficients of which are less than 0.

11. The grayscale compensating method according to claim 1, wherein the correction coefficients are greater than 0 and less than 1.

12. A displaying driving method, wherein the method is applied in a display panel, the display panel comprises a plurality of sub-pixels, and the method comprises:

for a to-be-displayed frame, determining to-be-displayed grayscale values corresponding to the plurality of sub-pixels;

by using the grayscale compensating method according to claim 1, compensating for the to-be-displayed grayscale values corresponding to the plurality of sub-pixels, to obtain post-compensation grayscale values; and based on the post-compensation grayscale values, driving the plurality of sub-pixels to emit light, to display the to-be-displayed frame.

13. The displaying driving method according to claim 12, wherein the step of, based on the post-compensation grayscale values, driving the plurality of sub-pixels to emit light comprises:

based on the post-compensation grayscale values corresponding to the plurality of sub-pixels, determining data voltages corresponding to the plurality of sub-pixels;

acquiring compensation voltages corresponding to the plurality of sub-pixels;

compensating for the data voltages based on the compensation voltages, to obtain post-compensation voltages corresponding to the plurality of sub-pixels; and based on the post-compensation voltages corresponding to the plurality of sub-pixels, driving the plurality of sub-pixels to emit light.

14. A driving chip, wherein the driving chip is applied in a display panel, and the driving chip is configured for implementing the grayscale compensating method according to claim 1.

15. A displaying system, wherein the displaying system comprises a grayscale compensating module and a burning module;

the grayscale compensating module is configured for determining displaying parameters corresponding to a first display panel, wherein the displaying parameters include compensation coefficients and correction coefficients corresponding to a plurality of sub-pixels in the first display panel, wherein the correction coefficients are determined by using the grayscale compensating method according to claim 1;

the burning module is configured for burning the displaying parameters outputted by the grayscale compensating module into the first display panel and a plurality of second display panels; and the second display panels and the first display panel are fabricated in a same one process flow.

16. A non-transitory computer-readable storage medium, wherein a computer program stored therein, when executed by a processor, implements the grayscale compensating method according to claim 1.

17. The grayscale compensating method according to claim 1, wherein after the compensation coefficient and the correction coefficient corresponding to one of the plurality of sub-pixels have been determined, the to-be-displayed grayscale value of the sub-pixel is compensated for according to the following formula:

$$G_{out} = G_{in} * k + \text{offset} * \text{Gray\_mask} * DBVscaler;$$

wherein $G_{out}$ represents a post-compensation grayscale value, $G_{in}$ represents the to-be-displayed grayscale value, offset represents the compensation coefficient, Gray_mask represents the correction coefficient, k is a constant quantity, and DBVscaler is used to adjust the compensation magnitudes of other brightnesses.

18. The grayscale compensating method according to claim 1, wherein the method further comprises:

if the to-be-displayed grayscale value of one of the plurality of sub-pixels is in a low-grayscale range, compensating for the to-be-displayed grayscale value of the sub-pixel according to the correction coefficient and the compensation coefficient; and if the to-be-displayed grayscale value of one of the plurality of sub-pixels is in a medium-high-grayscale range, compensating for the to-be-displayed grayscale value of the sub-pixel according to the compensation coefficient.

19. A displaying device, wherein the displaying device comprises a display panel, and the display panel comprises a plurality of sub-pixels;

the displaying device stores compensation coefficients and correction coefficients corresponding to the plurality of sub-pixels;

the compensation coefficients are for characterizing compensation modes and compensation magnitudes of brightness compensations to the sub-pixels, wherein the compensation modes include a mode of increasing a brightness and a mode of reducing a brightness;

the correction coefficients are determined based on the compensation coefficients and to-be-displayed grayscale values, unequal instances of the to-be-displayed grayscale values correspond to unequal instances of the correction coefficients, and the correction coefficients are for correcting the compensation magnitudes; and if the displaying device is operating in a preset grayscale range, after the to-be-displayed grayscale values of the plurality of sub-pixels have been corrected by using the compensation coefficients and the correction coefficients, no black-block region whose grayscale is 0 exists, and with a same one instance of the to-be-displayed grayscale values, displaying brightnesses of the plurality of sub-pixels approach a displaying brightness corresponding to the to-be-displayed grayscale value, wherein based on the compensation coefficients corresponding to the plurality of sub-pixels, delimiting the display panel into a first displaying region block and a second displaying region block, wherein the compensation coefficients in the first displaying region block are greater than 0, and the compensation coefficients in the second displaying region block are less than 0;

wherein the correction coefficients corresponding to the sub-pixels within the first displaying region block are the preset value for maintaining the compensation magnitudes; and the correction coefficients corresponding to the sub-pixels within the second displaying region block are the correction coefficients that are determined based on the compensation coefficients and the to-be-displayed grayscale values by using the target condition as the constraint.

* * * * *